United States Patent
Miller et al.

(10) Patent No.: US 10,693,303 B2
(45) Date of Patent: *Jun. 23, 2020

(54) MULTI-FUNCTIONAL PORTABLE POWER CHARGER

(71) Applicant: Halo International SEZC Ltd., George Town, Grand Cayman (KY)

(72) Inventors: Garold C. Miller, Hartford, CT (US); Nathan Daniel Weinstein, Hartford, CT (US)

(73) Assignee: HALO INTERNATIONAL SEZC LTD., Georgetown (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,024

(22) Filed: Nov. 19, 2018

(65) Prior Publication Data

US 2019/0089172 A1    Mar. 21, 2019

Related U.S. Application Data

(60) Continuation of application No. 15/946,212, filed on Apr. 5, 2018, now Pat. No. 10,135,271, and a
(Continued)

(51) Int. Cl.
*H02J 7/00* (2006.01)
*H02J 7/34* (2006.01)

(52) U.S. Cl.
CPC ............ *H02J 7/0031* (2013.01); *H02J 7/007* (2013.01); *H02J 7/0021* (2013.01); *H02J 7/342* (2020.01); *H02J 7/00* (2013.01); *Y02T 10/7055* (2013.01)

(58) Field of Classification Search
CPC ............ H02J 2007/0062; H02J 7/0021; H02J 7/0031; H02J 7/0054; H02J 7/007; H02J 7/342; H02J 7/00; Y02T 10/7055
See application file for complete search history.

(56) References Cited

U.S. PATENT DOCUMENTS

| 3,259,754 A | 7/1966 | Matheson |
| 4,286,172 A | 8/1981 | Millonzi et al. |

(Continued)

FOREIGN PATENT DOCUMENTS

| CN | 2659752 Y | 12/2004 |
| CN | 2803825 Y | 8/2006 |

(Continued)

OTHER PUBLICATIONS

"PowerAll", Internet archive with waybackmachine http://www.powerall.com/product, Jun. 1, 2014.
(Continued)

*Primary Examiner* — Nha T Nguyen
(74) *Attorney, Agent, or Firm* — Lathrop GPM LLP

(57) ABSTRACT

A portable charger capable of jump starting a 12 V car battery includes a charger battery, a jump start circuit operatively electrically connected with the charger battery and with an ignition power outlet, and a microcontroller for coordinating safety functions to establish or interrupt the operative electrical connection of the jump start circuit with the ignition power outlet. The ignition power outlet comprises a positive power socket, a negative power socket, a positive sensing socket and a negative sensing socket. The sensing sockets are electrically isolated from the power sockets, and the microcontroller senses voltage across the sensing sockets and is configured to interrupt the operative electrical connection of the jump start circuit to the ignition power outlet until proper voltage is sensed across the sensing sockets.

18 Claims, 21 Drawing Sheets

Related U.S. Application Data continuation of application No. 15/201,966, filed on Jul. 5, 2016, now Pat. No. 10,141,755, said application No. 15/946,212 is a division of application No. 15/201,966, which is a continuation-in-part of application No. 29/541,040, filed on Sep. 30, 2015, now Pat. No. Des. 797,663, and a continuation-in-part of application No. 14/848,668, filed on Sep. 9, 2015, now Pat. No. 10,075,000, and a continuation-in-part of application No. 14/848,623, filed on Sep. 9, 2015, now Pat. No. 9,819,204.

(60) Provisional application No. 62/232,047, filed on Sep. 24, 2015, provisional application No. 62/047,884, filed on Sep. 9, 2014.

(56) References Cited

U.S. PATENT DOCUMENTS

| | | |
|---|---|---|
| 4,638,236 A | 1/1987 | Carr et al. |
| 4,840,583 A | 6/1989 | Moore |
| 4,897,044 A | 1/1990 | Rood |
| 4,938,712 A | 7/1990 | Black |
| 4,969,834 A | 11/1990 | Johnson |
| 5,230,637 A | 7/1993 | Weber |
| 5,435,759 A | 7/1995 | Adams et al. |
| 5,601,452 A | 2/1997 | Ruffa |
| 5,795,182 A | 8/1998 | Jacob |
| 5,901,056 A | 5/1999 | Hung |
| 5,921,809 A | 7/1999 | Fink |
| 5,984,718 A | 11/1999 | James |
| 6,212,054 B1 | 4/2001 | Chan |
| 6,254,426 B1 | 7/2001 | Iacovelli et al. |
| 6,362,599 B1 | 3/2002 | Turner et al. |
| 6,471,540 B1 | 10/2002 | Fernandez |
| D494,541 S | 8/2004 | Hriscu et al. |
| 6,896,544 B1 | 5/2005 | Kuelbs et al. |
| 6,921,286 B1 | 7/2005 | Fernandez |
| 7,148,580 B2 | 12/2006 | Sodemann et al. |
| 8,076,900 B1 | 12/2011 | Brown |
| 8,199,024 B2 | 6/2012 | Baxter et al. |
| 8,376,755 B2 | 2/2013 | Rinehardt |
| D682,197 S | 5/2013 | Leung |
| D686,153 S | 7/2013 | Qu |
| D693,768 S | 11/2013 | Alesi et al. |
| D722,961 S | 2/2015 | Lin et al. |
| D727,257 S | 4/2015 | Miller et al. |
| 9,007,015 B1* | 4/2015 | Nook .............. H02J 7/0029 320/105 |
| D730,280 S | 5/2015 | Koebler |
| D735,403 S | 7/2015 | Che |
| D742,312 S | 11/2015 | Gupta et al. |
| 9,368,912 B1 | 6/2016 | Sullivan |
| D764,404 S | 8/2016 | Lau et al. |
| 9,461,376 B1 | 10/2016 | Bakhoum |
| D770,976 S | 11/2016 | Xu |
| 9,506,446 B2 | 11/2016 | Xinfang |
| D786,790 S | 5/2017 | Miller et al. |
| 9,653,933 B2 | 5/2017 | Inskeep |
| 9,819,113 B2 | 11/2017 | Adams et al. |
| 2004/0121225 A1* | 6/2004 | Krieger .............. H01M 2/1005 429/96 |
| 2004/0196888 A1 | 10/2004 | Musbach et al. |
| 2005/0040788 A1 | 2/2005 | Tseng |
| 2006/0145655 A1 | 7/2006 | Sheng |
| 2006/0202664 A1 | 9/2006 | Lindsey et al. |
| 2007/0285049 A1* | 12/2007 | Krieger .............. H01M 2/1055 320/105 |
| 2008/0169044 A1 | 7/2008 | Osborne et al. |
| 2008/0203966 A1 | 8/2008 | Ward |
| 2008/0238356 A1 | 10/2008 | Batson et al. |
| 2009/0042460 A1 | 2/2009 | Schey et al. |
| 2009/0230783 A1 | 9/2009 | Weed et al. |
| 2010/0301800 A1 | 12/2010 | Inskeep |
| 2011/0066895 A1 | 3/2011 | Windell et al. |
| 2011/0287673 A1 | 11/2011 | Fan et al. |
| 2012/0068662 A1 | 3/2012 | Durando et al. |
| 2012/0091944 A1 | 4/2012 | Rogers |
| 2012/0235629 A1 | 9/2012 | Wood |
| 2013/0026709 A1 | 1/2013 | Sampson et al. |
| 2013/0049675 A1 | 2/2013 | Minami |
| 2013/0154543 A1 | 6/2013 | Richardson et al. |
| 2014/0139175 A1 | 5/2014 | Gonzalez |
| 2014/0152787 A1* | 6/2014 | Listou .................. G03B 21/145 348/62 |
| 2014/0159509 A1 | 6/2014 | Inskeep |
| 2014/0227967 A1 | 8/2014 | Savage |
| 2014/0308995 A1* | 10/2014 | Wu .......................... H02J 7/007 455/573 |
| 2015/0054336 A1 | 2/2015 | Xinfang |
| 2015/0091392 A1 | 4/2015 | Hwang |
| 2015/0123620 A1 | 5/2015 | Nowak |
| 2015/0130400 A1 | 5/2015 | Inskeep |
| 2015/0288205 A1 | 10/2015 | Weinstein et al. |
| 2016/0052409 A1 | 2/2016 | Sun et al. |
| 2016/0181587 A1 | 6/2016 | Koebler et al. |
| 2016/0303989 A1 | 10/2016 | Lei |
| 2016/0308379 A1 | 10/2016 | Pan |
| 2016/0308382 A1 | 10/2016 | Pan |
| 2016/0359352 A1 | 12/2016 | Chiu |
| 2017/0012448 A1 | 1/2017 | Miller et al. |
| 2017/0110766 A1 | 4/2017 | Koebler |
| 2017/0317492 A1 | 11/2017 | Koebler |

FOREIGN PATENT DOCUMENTS

| | | |
|---|---|---|
| CN | 201472270 U | 5/2010 |
| CN | 203211234 U | 9/2013 |
| CN | 203707839 U | 7/2014 |
| CN | 104118374 A | 10/2014 |

OTHER PUBLICATIONS

Horizon Hobby, "E-flite EC3 Device & Battery Connector, Male/Female by E-flite (EFLAEC303)", downloaded from file history of U.S. Appl. No. 12/496,292, published on May 29, 2009, filed Jul. 1, 2009 IDS.

* cited by examiner

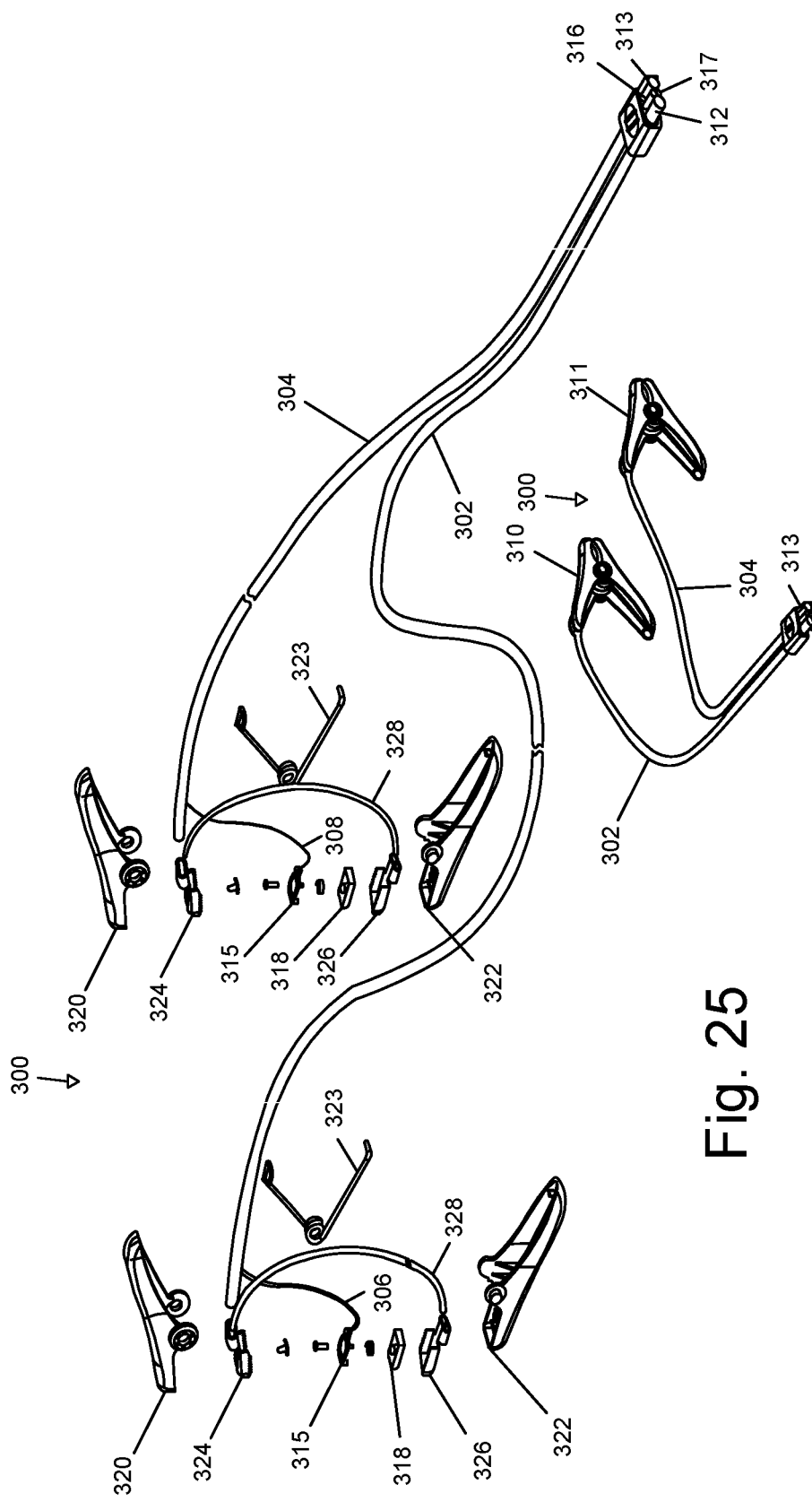

MULTI-FUNCTIONAL PORTABLE POWER CHARGER

CROSS-REFERENCE TO RELATED APPLICATIONS

This application is a continuation of U.S. patent application Ser. No. 15/201,966, filed Jul. 5, 2016, and which is a continuation-in-part of U.S. patent application Ser. No. 14/848,623, filed Sep. 9, 2015, and issued as U.S. Pat. No. 9,819,204; and U.S. patent application Ser. No. 14/848,668, filed Sep. 9, 2015, both of which claim the benefit of U.S. Provisional Application No. 62/047,884, filed Sep. 9, 2014; U.S. patent application Ser. No. 15/201,966, filed Jul. 5, 2016, also claims the benefit under 35 U.S.C. § 120 of U.S. Design patent application No. 29/541,040, filed Sep. 30, 2015 and claims the benefit under 35 U.S.C. § 119(e) of U.S. Provisional Application No. 62/232,047, filed Sep. 24, 2015, all of which are incorporated herein by reference in their entireties.

This application is also a continuation of U.S. patent application Ser. No. 15/946,212, filed Apr. 5, 2018, and which is a divisional of U.S. patent application Ser. No. 15/201,966, filed Jul. 5, 2016.

FIELD OF THE INVENTION

The present invention generally relates to portable power charger devices and batteries, and more particularly, the present invention relates to a multi-functional portable power charger that outputs both AC and DC power for charging a variety of hand-held electronics devices, including smart phones and laptops, as well as being able to jump start a car battery.

BACKGROUND OF THE INVENTION

Present day consumers typically own several electronic devices specifically designed for portability and use on-the-go, including, for example, a mobile phone or smart phone, a portable music player like an iPod® or an MP3 player, a tablet, a laptop computer, a portable gaming unit, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, different electronic devices often utilize different ports and interfaces such that a single charging cable is not compatible with multiple devices. Accordingly, a tech-savvy consumer, with several electronic devices, will usually have multiple charging cables to keep track of. Even then, the consumer may not always be in a place where a power source is readily available, or even if so, may not have the appropriate cable or adapter available to use with a particular power source.

With traditional power sources, such as those noted above, it is difficult to charge multiple devices at the same time, especially where each device requires a separate charging cable. For example, a car charger port will only handle a single cable at a time. Adaptor devices are available on the market for connecting multiple devices to a power source at the same time—for example, a two-to-one or three-to-one car charger splitter. However, such adapters are often only compatible with certain interfaces. Moreover, such adapters tend to be bulky.

Multi-source adapters are also available on the market for making a charging cable compatible with multiple power sources. For example, a charging cable with a traditional plug interface for connecting the cable to a wall outlet could exchange the plug with a car charger interface, or an airplane charger interface, or a standard USB interface. However, for such adapter devices, each of the interfaces is usually a separate piece, and therefore difficult to keep track of when not in use.

Similarly, interface attachments are also available for adapting a charging cable for use with a variety of devices, each with a different interface. However, such attachments are usually separate pieces, and therefore difficult to keep track of when not is use. Further, use of such attachments does not solve the problem presented by the need to charge multiple devices at the same time, as oftentimes, only one attachment can be used with a charging cable at a time.

Existing power charger devices also usually cannot charge multiple devices at the same time, and even are restricted as to the types of devices that can be charged by the power charger devices. For example, some charger devices are typically designed for specific devices, such as a particular brand, make or model of smart phone, and cannot be used for other devices, such as a laptop or tablet. Similarly, portable power charges often are designed to supply DC power to charge hand-held electronic devices, but lack the charging capacity to jump start a car battery. Similarly, power chargers designed to jump start a car battery often have too much power and would damage hand-held electronic devices. Even if multiple devices may be attached to the power charger at the same time, the charger will prioritize how the devices are recharged—i.e., it will charge one device first and then the second. However, this approach risks not having sufficient charge remaining in the charger for fully charging the second device.

Further, some portable charger devices will not permit recharging from the charger when the charger is itself being recharged or connected to a power source. Such devices require the charger unit to be disconnected from a power source before a charge will be passed on to a device connected to the charger. Also, some such charger devices must be fully charged first before any device connected to the charger unit can be recharged.

Still further, numerous portable power chargers are currently available on the market having a variety of shapes, sizes and designs. Commonly, however, such power chargers have a limited battery capacity, and are therefore limited in what can be charged and how much charge can be provided. Typically, such portable battery chargers are designed for simply charging portable electronic devices, such as smart phones, portable music players, and possibly tablets. Few portable battery chargers have sufficient power capacity for recharging laptop computers. Even fewer portable battery chargers are available for jump-starting car batteries, and those that are available on the market either are too big to transport in one's pocket, purse or bag, or simply cannot provide a sufficient amount of power to adequately jumpstart and recharge a car battery. Car battery chargers currently on the market, typically are not also usable for recharging portable electronic devices and laptop computers. Furthermore, car battery chargers presently on the market can be activated while the battery charging clamps are not yet connected to a battery. This potential presents a risk of sparking between the clamps, or a premature drain of the battery in the portable charger.

In view of the foregoing, there is a need for a multi-functional charger that can be used to charge a variety of devices including, for example, a car battery, a laptop computer, and a variety of hand-held, portable electronic devices, including but not limited to smart phones, mobile phones, data tablets, music players, cameras, camcorders, gaming units, e-books, Bluetooth® headsets and earpieces, GPS devices, and the like, either individually or collectively in various combinations. Additionally, there is a need for such a charger that is portable and easily used in various conditions and locations to charge one or more devices simultaneously, including but not limited to in a house or office, a car or an airplane. Accordingly, it is a general object of the present invention to provide a portable charger that improves upon conventional power chargers currently on the market and that overcomes the problems and drawbacks associated with such prior art chargers.

SUMMARY OF THE INVENTION

Certain embodiments of the present invention provide a portable power charger that outputs both AC and DC power. The portable power charger incorporates a charging plug and cable that can be stored in a storage position substantially flush with an exterior surface of a housing of the portable power charger. The portable power charger has a power button that controls its modes of operation, e.g. charging, power supply, or power block modes. The portable power charger also incorporates indicating lamps or LEDs that may illuminate the power outlet ports as well as the power button. The lamps or LEDs can indicate availability of the portable power charger for charging electronic devices (either via USB or AC connection interfaces) as well as battery charge level and operating mode of the portable power charger.

Certain other embodiments of the present invention provide a portable power charger that has multi-functional operation via a variety of connection interfaces—for example, combinations of a USB connection port and/or a similar AC connection port, a DC connection port, and an ignition power outlet. The USB or AC connection port can act as a power output and is used for connecting the power charger with electronic devices using appropriate charging cables and adapter units, as needed. The USB or AC connection port can alternatively act as a power input and is used for connecting the power charger with an external power source for recharging the internal battery of the power charger using appropriate charging cables and adapter units, as needed. In certain embodiments, multiple ports may be provided—for example, in a preferred embodiment illustrated in FIG. 1, two USB ports are provided along with a separate AC connection port. Additionally, though shown and described as USB ports, the ports may use other known connection interfaces, such as micro-USB, mini-USB, Apple Lightning™, Apple 30-pin, or the like, without departing from the spirit and principles of the present invention.

The DC connection port can act as a power input, is used for connecting the power charger with external power sources using appropriate charging cables with AC/DC adapters, as needed. In an embodiment of the present invention, a separate DC input and DC output may be provided.

An alternate AC connection interface can be added, designed primarily for charging laptops from the internal battery of the power charger. In this regard, the AC connection interface can act as a power output, and is used for connection to a laptop using appropriate cables and adapter units, as needed. Similarly, an AC power input can be provided to connect the power charger to an external power source for recharging the internal battery of the power charger using an AC adapter preferably supplied with the charger. Common AC sockets and plugs can be used for the output and input functionality, and moreover, the interfaces can be designed for U.S. and/or international standards.

The ignition power outlet is provided to connect the portable battery charger to a car battery for jump starting using jumper cables with positive and negative alligator clips or charging clamps. A specially designed end cap is provided to mate into the socket of the ignition power outlet at the end of the jumper cables opposite the alligator clips. The special end cap includes first and second power connections as well as first and second sensing connections. The first and second power connections are connected by the jumper cables to respective first and second alligator clips. The first and second sensing connections are connected by respective first and second sensing cables to respective first and second sensing contacts disposed within and electrically insulated from the respective first and second clamps.

Power chargers in accordance with the embodiments described and illustrated herein are readily portable as a result of the small, compact size of the charger housing. Despite the small size of the power charger, the power capacity is very high so that the battery unit can accommodate a variety of devices in need of recharging, including multiple devices at the same time, if necessary. In preferred embodiments, the battery unit comprises a rechargeable Lithium-Ion battery having a power capacity in the range of about 57,165 mWh to about 58,830 mWh. Such power capacity allows the portable charger to also be used to charge portable electronic devices. Moreover, such a power capacity level makes the present invention especially suitable for jump-starting a car battery.

The portable power charger in accordance with embodiments of the present invention also may include an LED work lamp or emergency floodlight, which is controlled by a lamp switch on the charger housing.

The power charger also comprises a controller or microprocessor, including a processing unit, configured to execute instructions and to carry out operations associated with the power charger. For example, the processing unit can keep track of the capacity level of the internal battery unit, store data or provide a conduit means by which data can be exchanged between electronic devices, such as between a smart phone and a computer. The processing unit communicates with the battery unit to determine how much capacity is remaining in the battery. Upon determining the capacity level, the processing unit can communicate with power indicator means to provide the user with information for how much capacity is remaining in the internal rechargeable battery unit and whether the charger needs to be connected to an external power source for recharging.

The portable power charger also may include power indicator means that will indicate the remaining capacity of the internal rechargeable battery unit in the power charger. For example, in an embodiment of the present invention, the power indicator means comprises a series of four LED lights, but can include more or fewer lights without departing from the principles and spirit of the present invention. When the battery is at "full" capacity—i.e., electric quantity between about 76% and about 100%—all the lights will be lit up. As the battery power decreases, the lights will correspondingly decrease by one as the power is used—e.g., three lights indicates electric quantity between about 51% and about 75%; two lights indicates electric quantity between about 26% and about 50%; and one light indicates electric quantity less than or equal to about 25%. Alternatively, the power indicator means can comprise a digital interface that provides a battery capacity level for the internal rechargeable battery unit, or another known means of providing battery level information.

In certain embodiments of the power charger, connector cables operatively communicating with the internal battery unit can be provided with the charger housing, and in some embodiments, storable within cavities formed in the charger housing from which they can be removed to connect to electronic devices in need of a recharge. Still further, such charging cables can be removable and replaceable so that varying connector interfaces—e.g., USB, Micro-USB, mini-USB, Apple Lightning, or Apple 30-pin—can be used with the portable power charger.

In certain embodiments of the power charger, a wireless transmitter and/or receiver can be included in the charger housing for wirelessly recharging the internal batteries of portable electronic devices that have an appropriate wireless receiver or wirelessly recharging the internal battery of the power charger from a wireless recharging station, such as designs shown and described in co-pending U.S. patent application Ser. No. 14/220,524, filed Mar. 20, 2014, and incorporated herein by reference.

Certain embodiments of a portable power charger in accordance with the present invention may include one or more low-voltage DC outputs (e.g., USB ports), a relatively high-voltage DC output (i.e., car ignition power outlet), and an AC inverter output.

These and other objects, features and advantages of the present invention will become apparent in light of the detailed description of embodiments thereof, as illustrated in the accompanying drawings. The illustrated embodiments and features of the present invention are intended only to illustrate, but not to limit, the invention.

BRIEF DESCRIPTION OF THE DRAWINGS

FIG. 25 shows in perspective view a jumper cable assembly according to embodiments of the invention.

FIG. 26 shows in exploded perspective view the jumper cable assembly of FIG. 22.

DETAILED DESCRIPTION OF THE DRAWINGS

Figure 1:
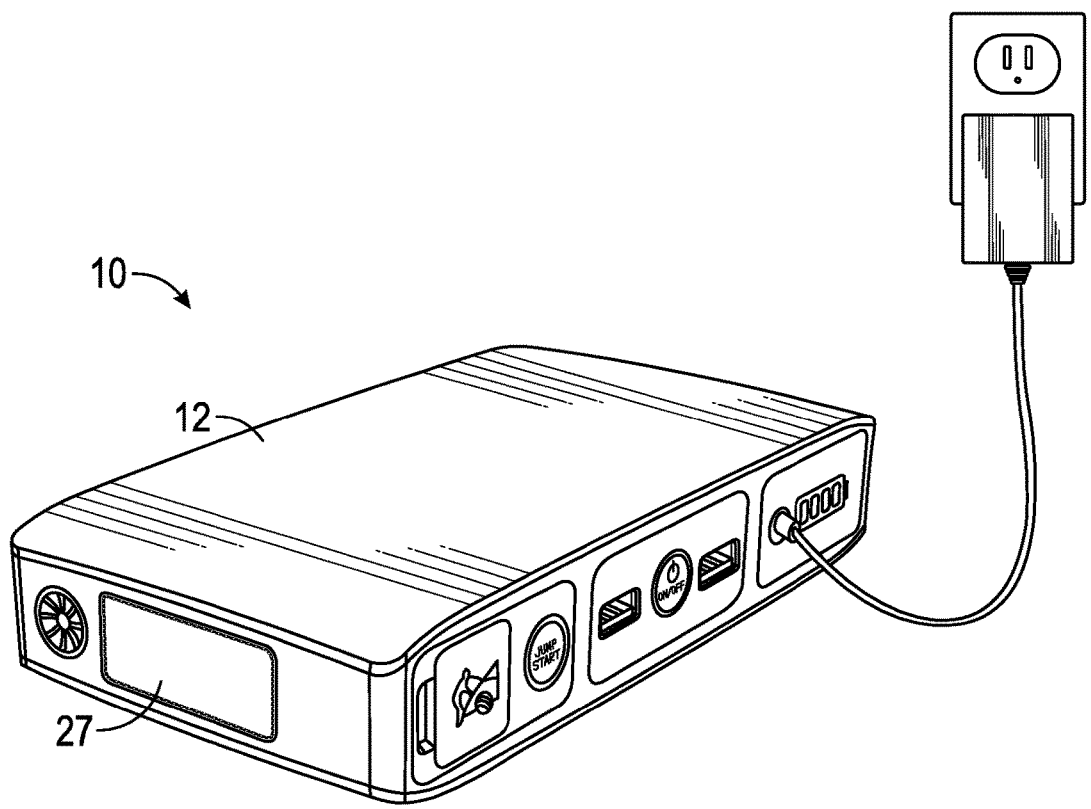
FIG. 1 shows in perspective view a portable charger according to a first embodiment of the present invention.
Figure 2:
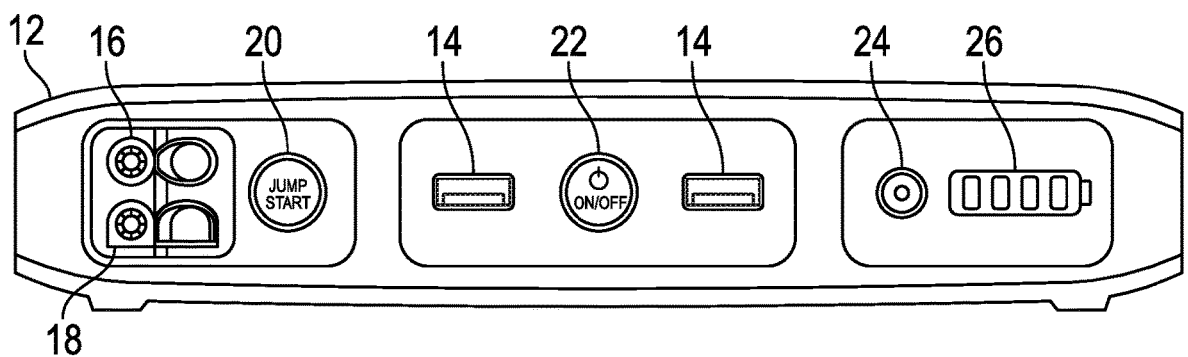
FIG. 2 shows in front view the portable charger of FIG. 1.

FIGS. 1 and 2 illustrate a portable power charger 10 in accordance with a first embodiment of the present invention. The illustrated charger 10 is capable of jump starting a 12V car battery, as well as charging 5V portable electronic devices. The portable charger 10 comprises a housing 12, that includes at least one 5 V USB output connection port 14. As shown in FIG. 2, a preferred embodiment utilizes 2 USB ports 14 operatively controlled by a power button 22. Also at the outside of the housing 12 are differently-shaped positive and negative 12 V jumper cable jacks 16, 18 (collectively, an "ignition power outlet") operatively connected to a jump start button 20 for jump starting a car battery. The housing 12 is also provided with a 14 V DC charging input port 24, which as illustrated in FIG. 1, is used for recharging the internal battery of the charger 10 using a power adapter preferably provided with the charger 10. The charger 10 also includes battery level indicator LEDs 26 and a lamp 27 (e.g., a LED or fluorescent lamp).

Figure 3:
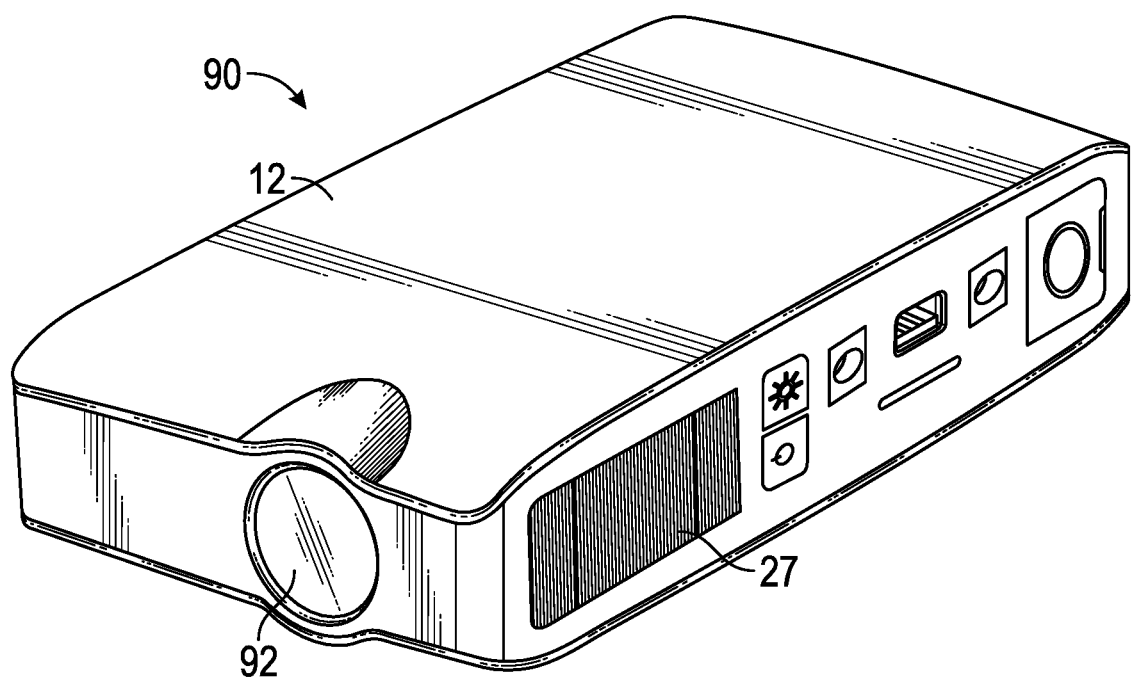
FIG. 3 shows in perspective view a portable charger according to a second embodiment of the present invention.
Figure 4:
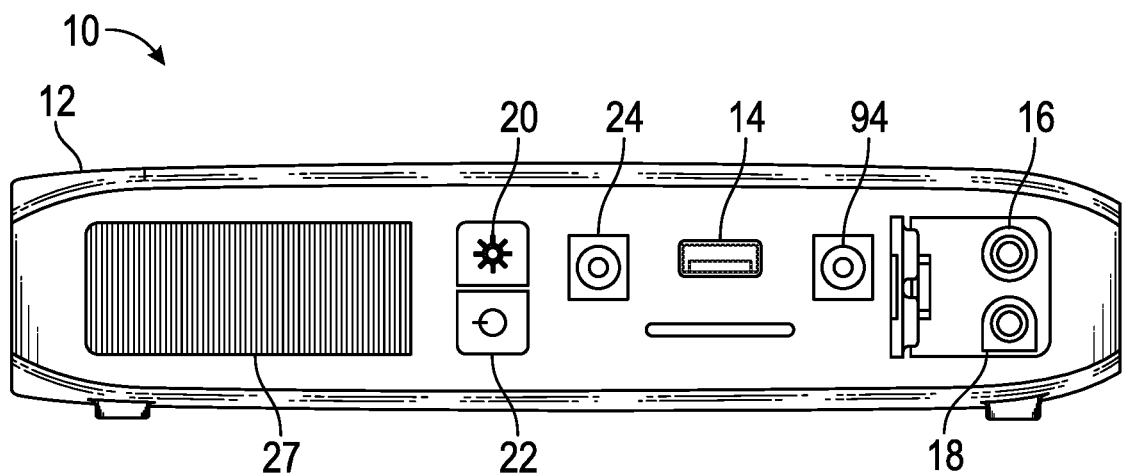
FIG. 4 shows in front view the second portable charger of FIG. 3.

Referring to FIGS. 3-4, in another embodiment of the present invention, a portable power charger 90 includes a second lamp 92 (e.g., LED or fluorescent) as well as a DC output jack 94. Other components of the portable charger 90 illustrated in FIGS. 3-4 are similar to, and similarly numbered as, those described with reference to the charger 10 illustrated in FIGS. 1-2.

Figure 5:
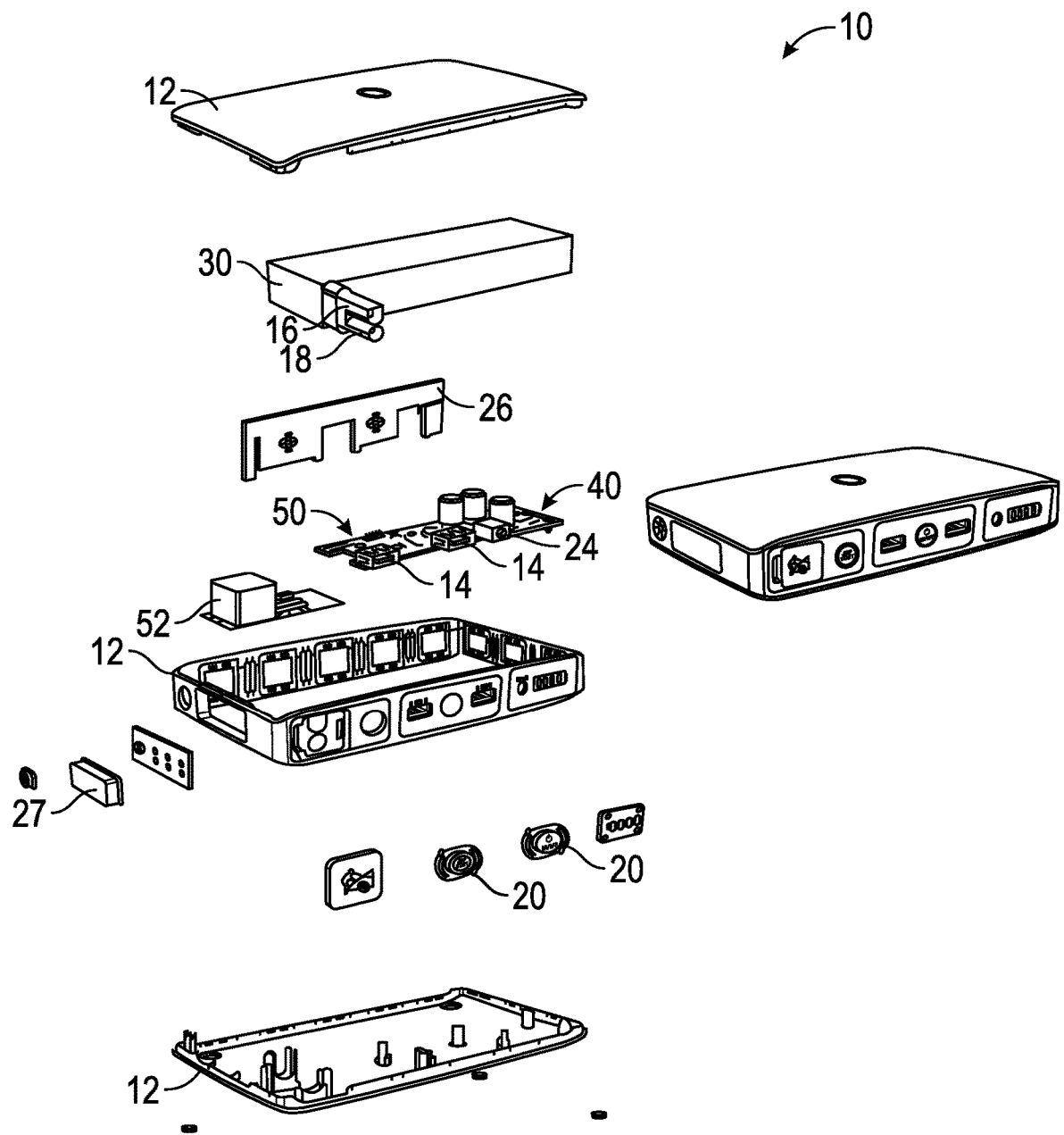
FIG. 5 shows in exploded assembly view the portable charger of FIG. 1.

FIG. 5 shows an exploded assembly view of the portable charger 10. Inside the housing 12, the portable charger 10 houses an internal rechargeable battery 30 (e.g., a lithium ion type battery), and an operative circuitry 40 that operatively connects the charger battery 30 with the at least one USB output port 14 for providing +5V USB power, and with the jumper cable jacks for providing about +12 V DC power. The operative circuitry 40 includes a safety circuit 50 that operatively connects the power supply 30 with the jumper cable jacks 16, 18. All these components are in common between either of the portable chargers 10 or 90, thus, what is described with reference to FIG. 5 for the portable charger 10 as shown in FIGS. 1-2, applies equally to the portable charger 90 as shown in FIGS. 3-4.

The charger battery 30, in certain embodiments, can be a series-connected three cell lithium ion polymer battery rated at 3.7 V per cell (11.1 V total), capable of 500 A peak current, in excess of 57000 mWh capacity, with charging circuitry to support a charge voltage of 14 V. Such specifications enable the portable charger 10 to be of moderate size—i.e., less than about 30 cm along any edge—while also being capable of at least three jump start attempts on a standard 12 V car battery. The circuitry 40 allows up to 500 Amp of peak current to be drawn for jump starting an automotive battery that is connected to a vehicle. Additionally, the circuitry 40 provides 5 V DC output to the USB connection port for charging hand-held, portable electronic devices from the same power supply 30 without risking damage to the devices.

Generally, the safety circuit 50 enables operative connection of the jumper cable jacks 16, 18 with the charger battery terminals, in case there is a voltage differential of at least about 11 V across the positive and negative jumper cable jacks. The safety circuit 50 interrupts at least the operative connections of the charger jacks 16, 18 with the charger battery 30, in case any of the following shut off conditions occurs: insufficient voltage across the positive and negative charger jacks 16, 18; reverse polarity of the positive and negative charger jacks 16, 18; reverse current to the charger battery 30; continuity connection detection to either of the positive or negative vehicle battery terminals; or excess temperature of the charger battery 30.

To implement the above-described functionality, the safety circuit 50 initiates a jump start safety check sequence 100 (further described below with reference to FIG. 11) in response to a user actuation of the jump start button 20. Upon successful completion of the jump start safety check sequence, the portable charger 10 provides 12 V DC current from the charger battery 30 to the charger jacks 16, 18. Moreover, upon completion of the jump start safety check sequence the portable charger 10 remains ready to provide 12 V DC current during a pre-determined period of time. For example, during the pre-determined period of time the portable charger 10 provides 12 V DC current from the charger battery 30 to the charger jacks 16, 18 in response to a second user actuation of the jump start button 20. For example, the pre-determined period of time is sufficient for three discrete jump start attempts. According to certain embodiments, the portable charger 10 discontinues readiness after three discrete jump start attempts.

Referring to FIGS. 6-10, the safety circuit 50 comprises a jump start relay 52, a microprocessor 54, a voltage input analyzer 56, a differential voltage amplifier 58, a reverse polarity detector 60, a reverse current protector 62, and a thermistor 64 that are operatively connected with the microprocessor 54 to enable or disable the jump start relay.

More particularly, a port PD1 of the microprocessor 54 is operatively connected to actuate a transistor 66, which energizes or de-energizes the jump start relay 52. The microprocessor 54 also is configured to execute instructions and to carry out operations associated with the power charger 10. For example, the processing unit can keep track of the capacity level of the battery unit 30, store data or provide a conduit means by which data can be exchanged between electronic devices, such as between a smart phone and a computer. The processing unit communicates with the battery unit 30 to determine how much capacity is remaining in the battery. Upon determining the capacity level, the processing unit can communicate with the power indicator means 26 in order to display information for how much capacity is remaining in the internal rechargeable battery unit and whether the charger 10 needs to be connected to an external power source for recharging.

Figure 6:
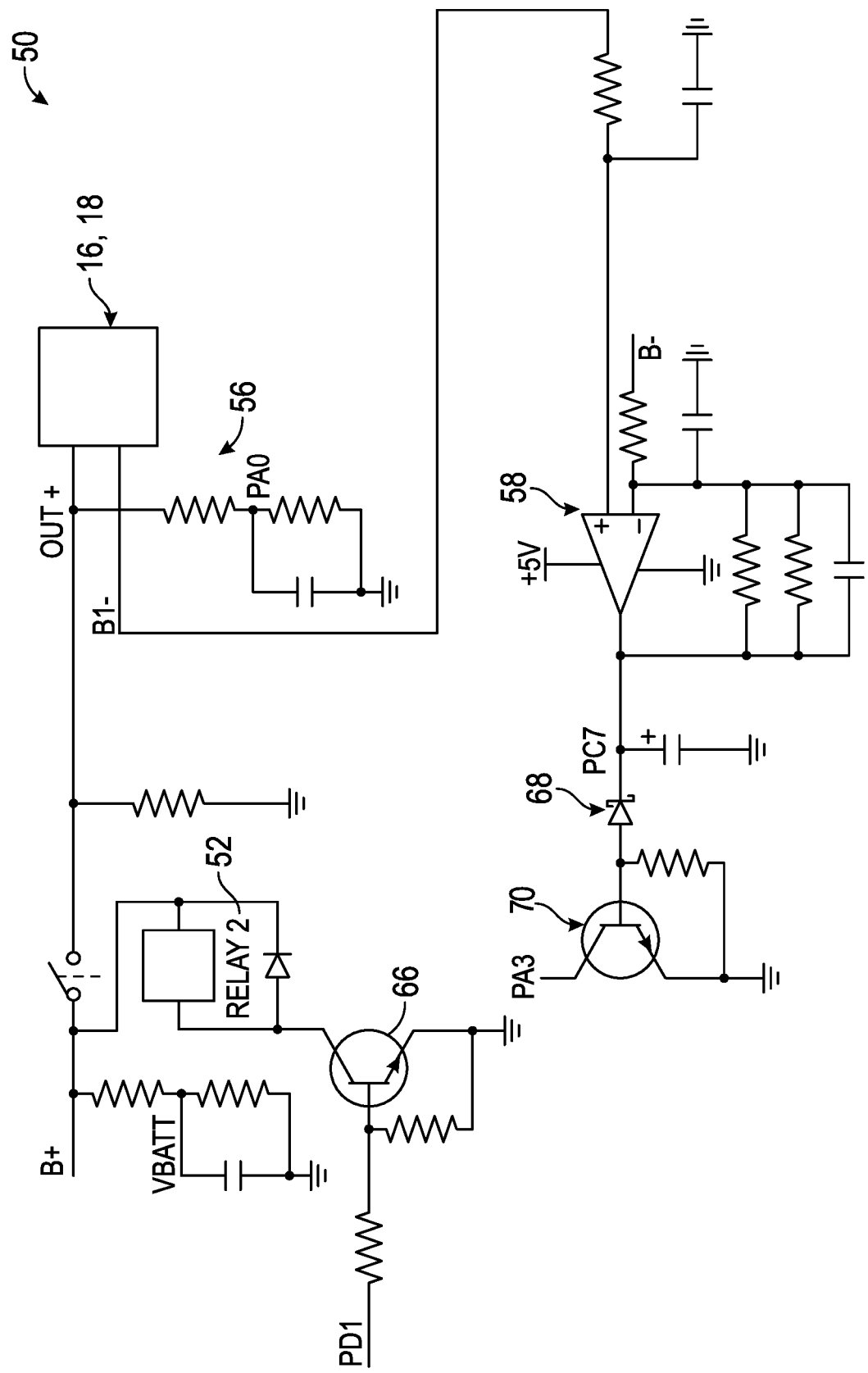
FIG. 6 shows a safety circuit schematic of either portable charger of FIG. 1 or FIG. 3.

FIG. 6 shows the voltage input analyzer 56, which is operatively connected between the jumper cable jacks 16, 18. The voltage input analyzer 56 includes a voltage divider so that it sends to a port PA0 of the microprocessor 54 a fraction of the voltage across the terminals of a vehicle battery to be charged. In case there is a sufficient voltage differential (the jumper cable jacks 16, 18 are connected to a battery), then the fractional voltage from the voltage input analyzer 56 will cancel a default signal at microprocessor port PA0 with the result that the microprocessor 54 will have one of the inputs required in order to energize or enable the jump start relay 52. Thus, the safety circuit 50 can enable the operative connection of the jumper cable jacks 16, 18 to the charger battery 30, only if the charger battery 30 voltage is satisfactory.

FIG. 6 also shows the differential current amplifier 58, which compares the negative terminal voltages of the charger battery 30 and of the vehicle battery to be charged, and sends a signal to port PC7 of the microprocessor 54 in case the charging current exceeds a tolerance threshold. Moreover, in case the differential current amplifier output exceeds a breakthrough voltage of a Zener diode 68, then the output gates a transistor 70 to cause a signal at port PA3 of the microprocessor 54. These two signals disable the microprocessor from energizing or enabling the jump start relay 52. Thus, the safety circuit 50 can enable the operative connection of the jumper cable jacks 16, 18 to the charger battery 30, only if the negative terminal voltages match within the pre-determined tolerance threshold.

Figure 7:
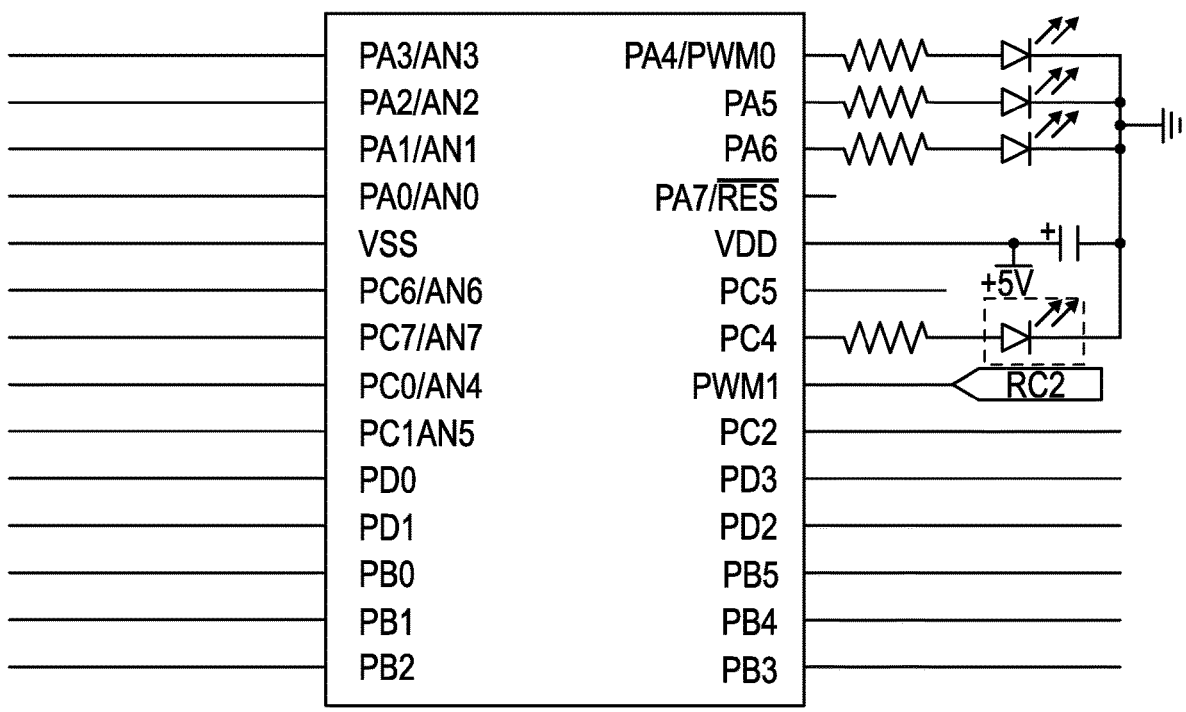
FIG. 7 shows an exemplary microprocessor pinout of the portable charger of FIG. 1.

FIG. 7 shows the microprocessor 54, which includes the following ports:

PA3: A/D port battery temperature detection;
PA2: A/D port battery voltage detection;
PA1: ADI 5V USB current detection;
PA0: Out—check external voltage detection;
VSS: GND;
PC6: V2 charging voltage detection;
PC7: V4 battery current output detection;
PC0: V5 charging voltage and battery voltage detection;
PC1: V3 back to the charging current detection;
PD0: on/off port;
PD1: relay control port;
PB0: reverse battery detection;
PB1: LED on/off control;
PB2: jump bottom control;
PB3: light bottom control;
PB4: jump green light control;
PB5: jump red light control;
PD2: on/off light control;
PD3: USB output control;
PC2: on/off bottom voltage control;
PWM1: PWM signal output;
PC4: LED battery indicator control;
VDD: VCC; and
PA6-PA4: LED battery indicator control.

Figure 8:
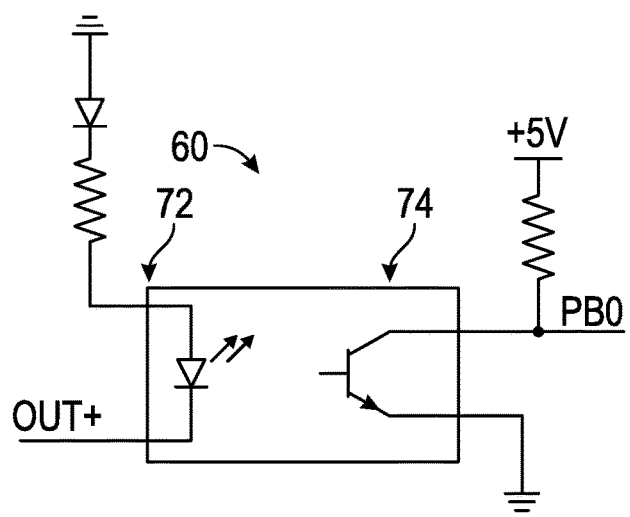
FIG. 8 shows a reverse polarity detector of either portable charger of FIG. 1 or FIG. 3.

FIG. 8 shows the reverse polarity detector 60, which may include a light emitting diode 72 that is connected in electrical series between ground and the positive jumper cable jack 16, and may also include a phototransistor 74 in optical communication with the light emitting diode and connected in electrical series between ground and a reverse polarity detection terminal PB0 of the microprocessor 54. In case the jumper cables are connected backwards—i.e., the positive jumper cable jack is connected to a negative terminal of the vehicle battery to be charged—then reverse polarity will be detected by energization of the light emitting diode 72 and corresponding conduction by the phototransistor 74. This will cause a signal at the microprocessor port PB0, which will cancel the inputs required in order to energize or enable the jump start relay 52. Thus, the safety circuit 50 disables the operative connection of the jumper cable jacks 16, 18 to the charger battery 30, in case the jumper cable jacks are connected backwards to the vehicle battery.

Figure 9:
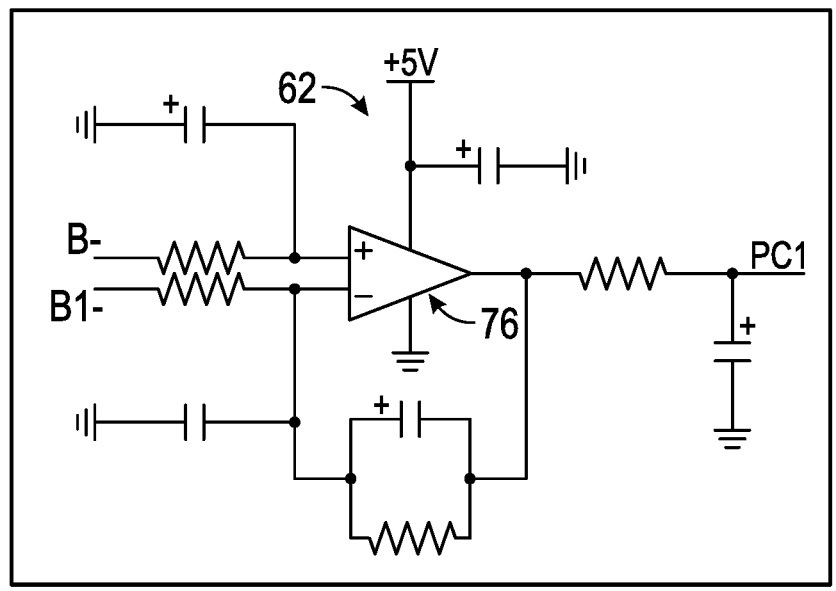
FIG. 9 shows a reverse current protector of either portable charger of FIG. 1 or FIG. 3.

FIG. 9 shows the reverse current protector 62, which may incorporate an operational amplifier 76 operatively connected between the charger battery 30 negative terminal and the negative jumper cable jack 18. In case the voltage differential across the op amp 76 reverses, then the reverse current protector 62 sends a signal to port PC1 of the microprocessor 54, which will cancel the inputs required in order to energize or enable the jump start relay 52. Thus, the safety circuit 50 disables the operative connection of the jumper cable jacks 16, 18 to the charger battery 30, in case the vehicle battery begins to send current back through the charger battery.

Figure 10:
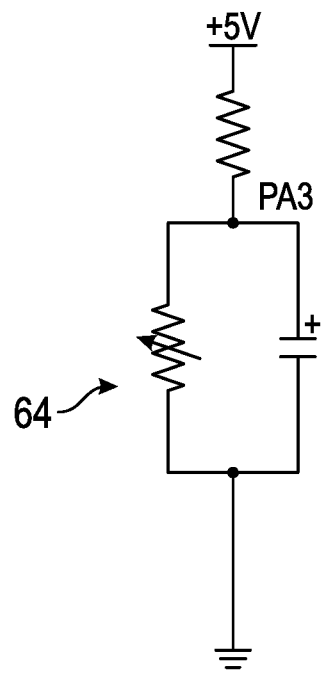
FIG. 10 shows a temperature control circuit of either portable charger of FIG. 1 or FIG. 3.

FIG. 10 shows the thermistor 64 (or equivalent temperature-sensing circuitry) is mounted adjacent the charger battery 30 and is operatively connected with the microprocessor 54 to provide a signal at PA5 in case the charger battery temperature exceeds a pre-determined threshold. Thus, the safety circuit 50 disables the operative connection of the jumper cable jacks 16, 18 to the charger battery 30, in case the charger battery exceeds a pre-determined temperature.

Figure 11:
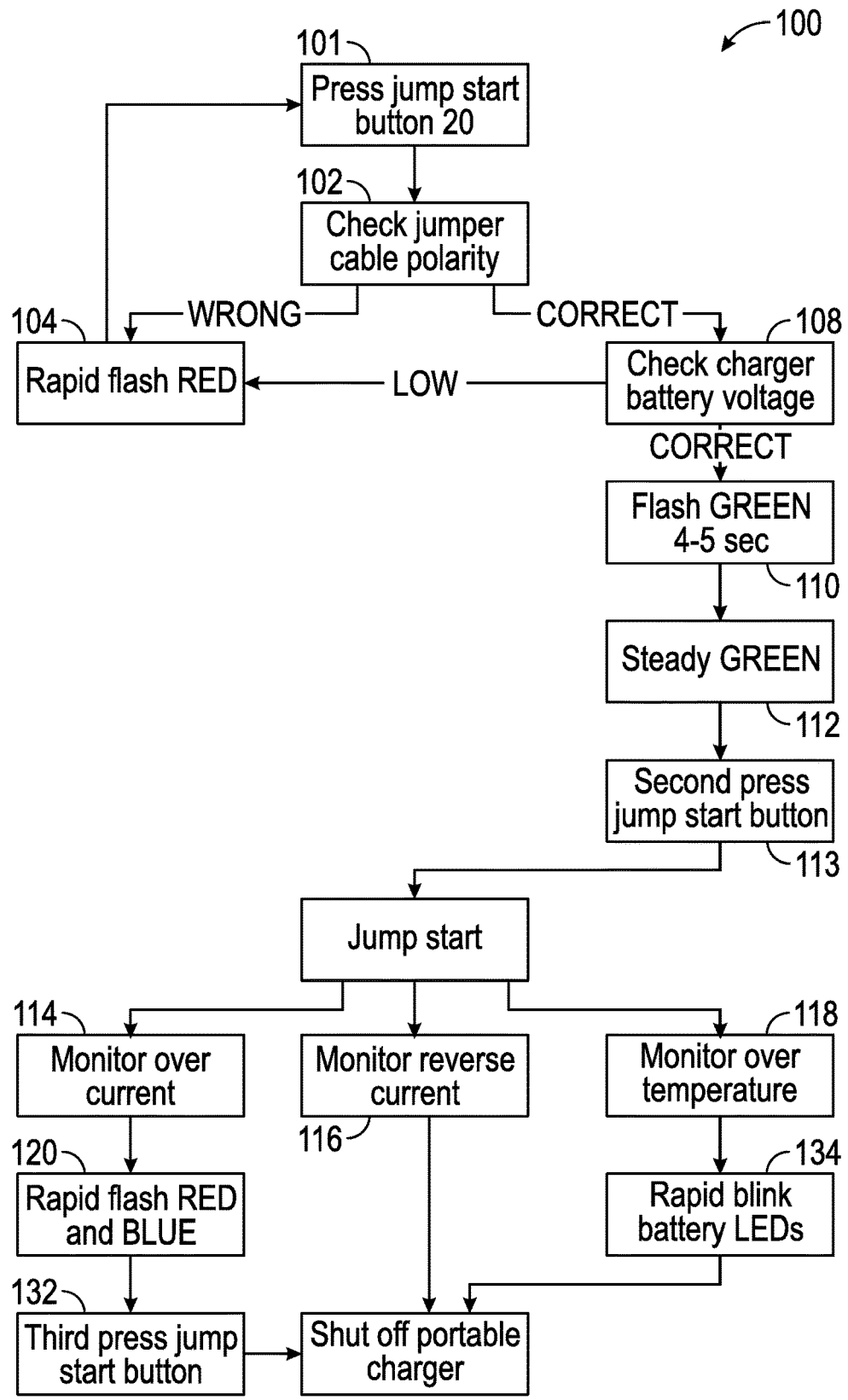
FIG. 11 shows a flowchart of a method of use and operation of either portable charger of FIG. 1 or FIG. 3.

FIG. 11 shows a flowchart of a jump start safety sequence 100 utilized by the charger 10 of the present invention. At a step 101, the user manually presses the jump start button 20 on the portable charger 10. Pressing the jump start button 20 initiates the jump start safety check sequence 100. At step 102, the safety circuit 50 checks jumper cable polarity using the reverse polarity detector 60. The jump start button 20 will rapidly flash RED 104 if the jumper cables are not connected correctly. If the jumper cables are correctly connected, then the safety circuit 50 will check for adequate charger battery 30 voltage at step 108 using the voltage input analyzer 56. The voltage input analyzer circuit 56 sends signals to pins PA0, PC5 of the microprocessor 54, which receives the fractional voltage from the positive terminal of the charger battery 30 in order to assess the voltage differential from the charger battery positive terminal to the negative terminal of the charger battery 30 that the portable charger 10 will be used to jump start. If a voltage is not detected, the safety circuit 50 will signal the microprocessor 54 to disable the jump start relay 52. On the other hand, if the microprocessor 54 senses at least a minimum voltage differential, it will then enable the jump start relay 52.

Figure 12:
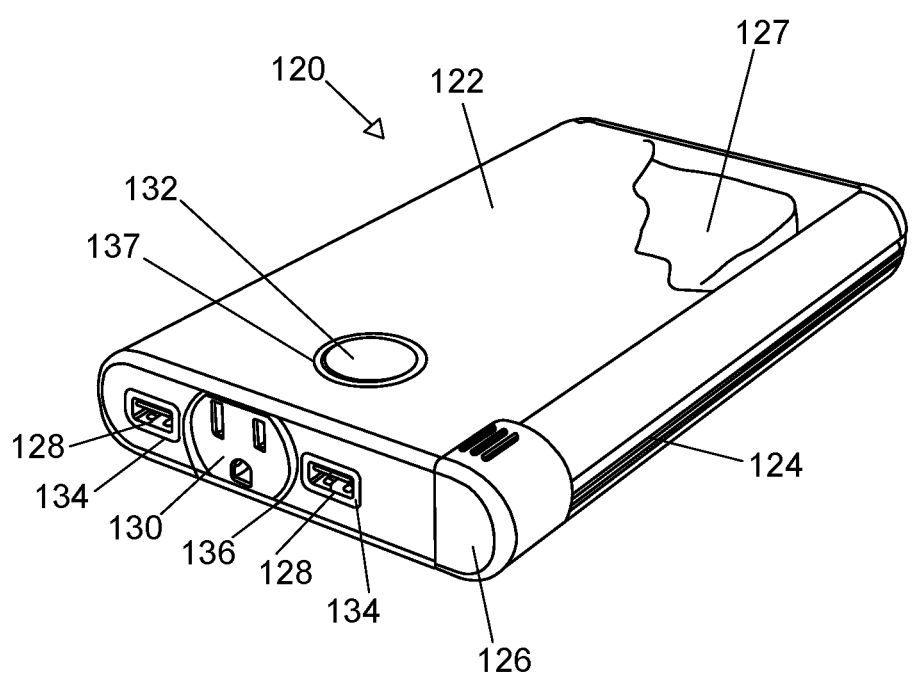
FIG. 12 shows a first perspective view a portable charger according to a third embodiment of the present invention.

Referring to FIG. 12, a portable power charger 120, in accordance with a third embodiment of the present invention is illustrated. The illustrated charger 120 generally includes a housing 122 that houses an internal rechargeable battery 127 (shown in FIG. 14) and operational circuitry similar to that described with respect to other embodiments herein. The housing 122 also houses a charging cable 124 and a plug 126 disposed at the end thereof operatively connected with the internal battery 127 for providing a charge to the battery 127 from an external power source when the cable 124 and plug 126 are connected to such a power source. The charger 120 also preferably includes as power output one or more USB power connection port 128 and an AC power interface 130.

The housing 122 may be fabricated by various means from various materials—e.g., molded plastic, stamped and pressed sheet metal, machined plastic or metal billet. The charging cable 124 and plug 126 are shown in a storage position, substantially flush with an external surface of the housing 122. The charging cable 124 and plug 126 can be moved from the storage position to a deployed position (shown in FIG. 13) in order to recharge the internal battery 127 (shown in FIG. 14) via connection to an external power source as discussed above—e.g., a standard U.S. wall socket.

The power interfaces 128, 130 are operatively connected to and therefore powered by the internal battery 127, and preferably act as power outputs for providing a charge from the internal battery 127 to an electronic device connected to the charger 120 via one of the interfaces 128, 130. In accordance with the present invention, multiple electronic devices can be connected to the charger 120 at the same time. The power interfaces 128, 130 can be activated or de-activated for use by means of a power button 132, which controls the configuration of a battery management module 133 (shown in FIG. 14). The power button 132 is shown as a push button but can be a rocker switch, a slide switch, or the like.

Although the AC power interface 130 is shown as a U.S. NEMA 5-15 socket (standard 120 V 60 Hz grounded outlet), it could instead be made to another standard (e.g., Europlug, JIS). Alternatively, one or more power adapters could be packaged with the portable power charger 120. Similarly, the plug 126, though shown as a standard U.S. 3-pring AC plug, may take the form of other plugs or be connected to various adapters conforming to other international standards.

Instead of or in addition to the USB and AC power interfaces 128, 130, the portable power charger 120 may include a wireless power transmitter (not shown) disposed within the housing 122 for wireless power transmission of a charge to an electronic device having a compatible wireless receiver. Instead of or in addition to the charging cable 124 and plug 126, the portable power charger 120 may include a wireless power receiver (not shown) disposed within the housing 122 for wirelessly recharging the internal battery 127 from a wireless power transmission device, such as a wireless charging mat as is known in the art.

When the power interfaces 128, 130 are activated—i.e., when the battery management module 133 is configured in a mode to supply power to the power outlets for use by electronic devices—then the power interfaces 128, 130 may be illuminated by respective LEDs 134, 136 whereas the power button 132 may be illuminated by its own LED 137. The LEDs 134, 136, 137 may be of differing colors—e.g., blue for the USB power interfaces 128; purple for the AC power interface 130; and green for the power button 132. When the power interfaces 128, 130 are de-activated—i.e., when the battery management module 133 is configured in a mode to block power to the power outlets—then the LEDs 134, 136 will be extinguished. As shown in FIG. 12, the LEDs may be ring-like in shape—i.e., surrounding the respective power outlets. Nonetheless, other shapes—e.g., square or circle adjacent to the respective power connection ports—may be acceptable.

Figure 13:
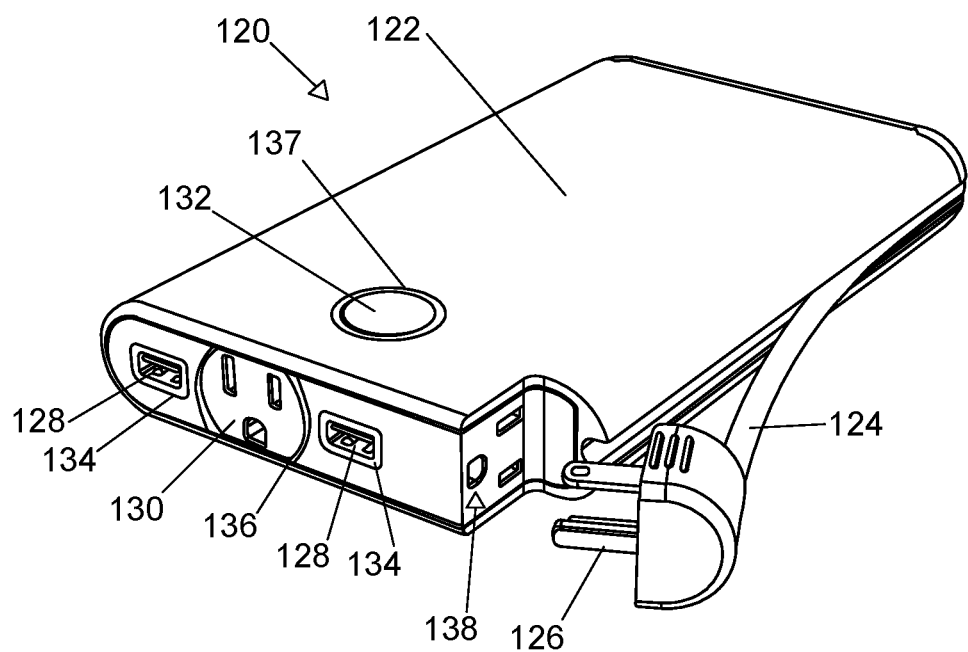
FIG. 13 shows a second perspective view the third portable charger of FIG. 12 with a plug and connector cable flexed away from the charger housing.

FIG. 13 shows the charging plug 126 and cable 124 removed from their storage position to a deployed, use position, from which the plug 126 can be inserted into a U.S. standard AC wall outlet for recharging the internal battery 127 of the charger 120. Although the charging plug 126 is shown as a three-prong plug it can equally be provided as a two-prong plug. As can be seen from FIG. 13, the case 122 includes a socket 138, into which the prongs of the charging plug 16 can be inserted in the storage position. In certain embodiments, the socket 138 may also serve as the AC power outlet 130 or an additional connection interface, although in this case additional safety circuitry will be incorporated into the charging circuitry to prevent a closed loop from the internal battery 127 through the cable 124 back to the battery 127.

Figure 14:
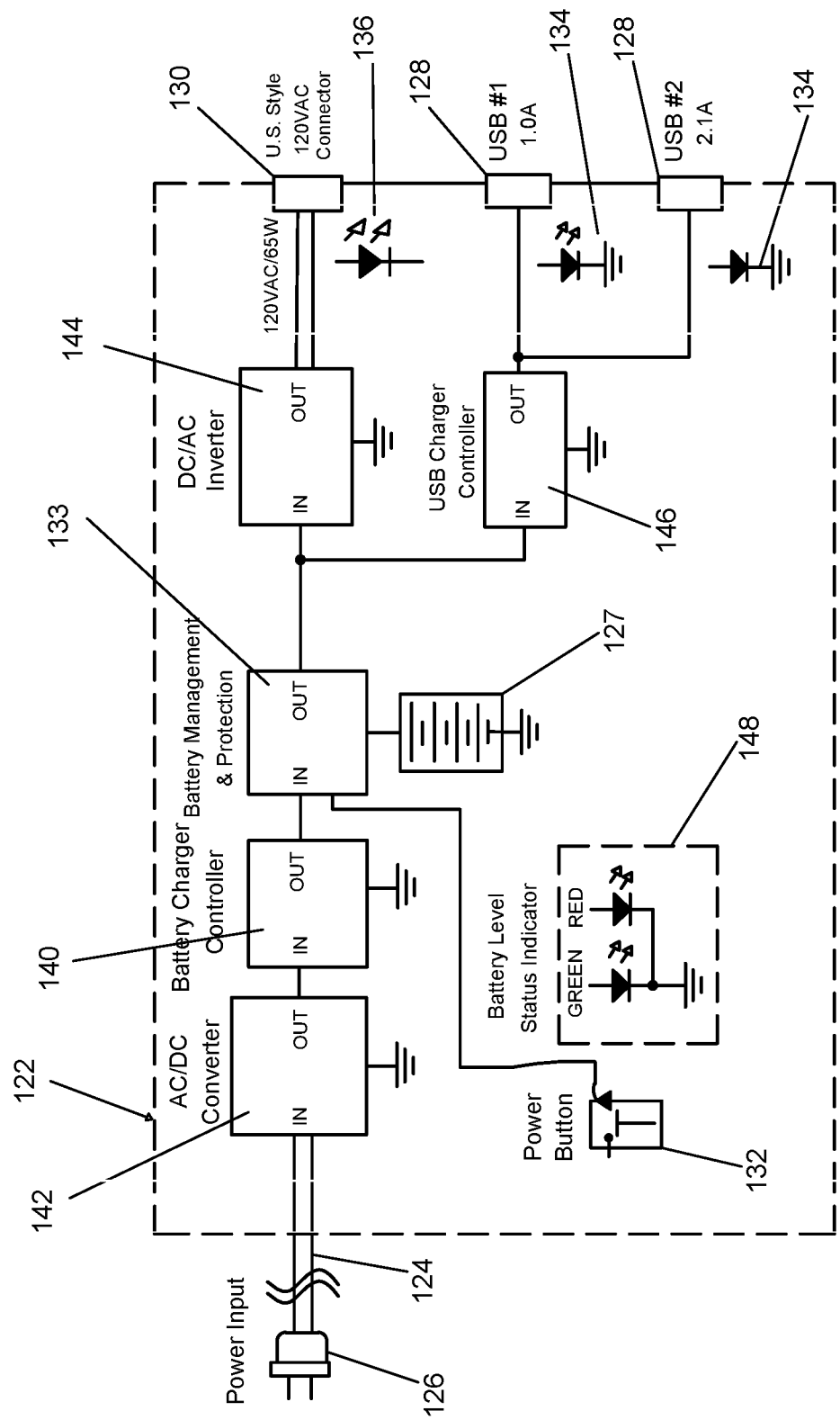
FIG. 14 shows in schematic view the third portable charger of FIG. 12.

Referring to FIG. 14, the internal battery 127 can be a lithium polymer type battery, three or four cells. The internal battery 127 can have varying capacity. Capacities of 22,000 mWh, 33,000 mWh, 44,000 mWh, 57,720 mWh or 58,830 mWh are possible. The internal battery 127 is operatively electrically connected to other components of the portable power charger 120 via the battery management module 133. The power button 132 is operatively electrically connected to control the battery management module 133. The power button 132 controls the battery management module 133 to be in a power supply mode or in a power block mode, as further discussed below.

In certain embodiments of the present invention, the battery management module 133 is an 8-bit microprocessor with low pin count, low cost, low power sleep capability. For example, a microchip PIC may be used.

Referring to FIG. 14, at a first side, the battery management module 133 operatively electrically connects the internal battery 127 with a battery charge controller 140. The battery charge controller 140 operatively electrically connects the battery management module 133 with an AC/DC converter 142, which can, for example, accept AC input of 90-277 V at 50 Hz or 60 Hz, not in excess of 100 W. The AC/DC converter 142 operatively electrically connects the battery charge controller 140 to the charging cable 124.

At a second side, the battery management module 133 operatively electrically connects the internal battery 127 with a DC/AC inverter 144 and with a USB charge controller 146. The DC/AC inverter 144 operatively electrically connects the battery management module 133 with the AC power outlet 130, whereas the USB charge controller 146 operatively electrically connects the battery management module 133 with the USB power outlets 128 and with the LEDs 134, 136.

The battery management module 133 also is operatively electrically connected with a battery level status indicator 148, which includes red and green LEDs. The green LED can be illuminated alone for indicating a high battery charge level of about 75%-100% capacity. The green and red LEDs can be illuminated together for a yellow color for indicating a moderate battery charge level of about 50%-74% capacity. The red LED can be illuminated alone for indicating a low battery charge level of about 5%-49% capacity. While the battery is being recharged, then the battery level status indicator LEDs 148 can be blinked or flashed to indicate charging condition. In certain embodiments, the battery level status indicator 148 may be provided in place of the power button LED 137—i.e., when the power button 132 is actuated to put the battery management module 133 into a power supply mode, or when the charging plug 126 is plugged into an AC power source, then the battery level status indicator 148 will illuminate the power button 132 with a color appropriate to the battery charge level as discussed above.

In operation, when the battery charge controller 140 detects DC power available from the AC/DC converter 142, this means that the charging plug 126 has been plugged into an AC power supply. In this condition, the battery charge controller 140 places the battery management module 133 into a recharge mode in which the battery management module provides DC power only to the USB charge controller 146 but not to the DC/AC inverter 144. The battery charge controller 140 can place the battery management module 133 into the recharge mode regardless of the condition of the power button 132.

In the recharge mode, the battery level status indicator 148 and/or the power button LED 137 will continuously blink or flash to indicate battery recharging. Also, the USB power outlet LEDs 134 may be lit steadily or may blink whereas the AC power outlet LED 136 will not be lit. The battery management module 133 will direct power from the battery charge controller 140 to the internal battery 127. The battery charge controller 140 will continuously monitor and manage the charge level of the internal battery 127. This includes, for example, cell balancing among the three or four cells of the internal battery 127. Additionally, the battery charge controller 140 integrates cell protection—e.g., by gas gauging. An exemplary embodiment of the battery charge controller 30 utilizes a Texas Instruments model BQ40Z50 chip.

When the battery management module 133 is not in the recharge mode, then the power button 132 controls the mode of the battery management module between a power supply mode and a power block mode.

In the power supply mode, the battery management module 133 provides power from the internal battery 127 to both the DC/AC inverter 144 and the USB charge controller 146. The DC/AC inverter 144 provides, for example, 120 V AC modified sine wave current, at maximum power of about 65 W, to the AC power outlet 130. The USB ports 128 provide 5 V DC at 1 A or at 2.1 A. The respective LEDs 134, 136 are steadily lit for both the USB power outlets 128 and for the AC power outlet 130. The power button LED 137 also is lit, as is the battery level status indicator 148. In other embodiments, the LEDs 134, 136 may be lit only when their respective ports are in use for charging an electronic device.

In the power block mode, the battery management module 133 does not provide power from the internal battery 127. The LEDs 134, 136, 137 and the battery level status indicator 148 are not lit.

Figure 15:
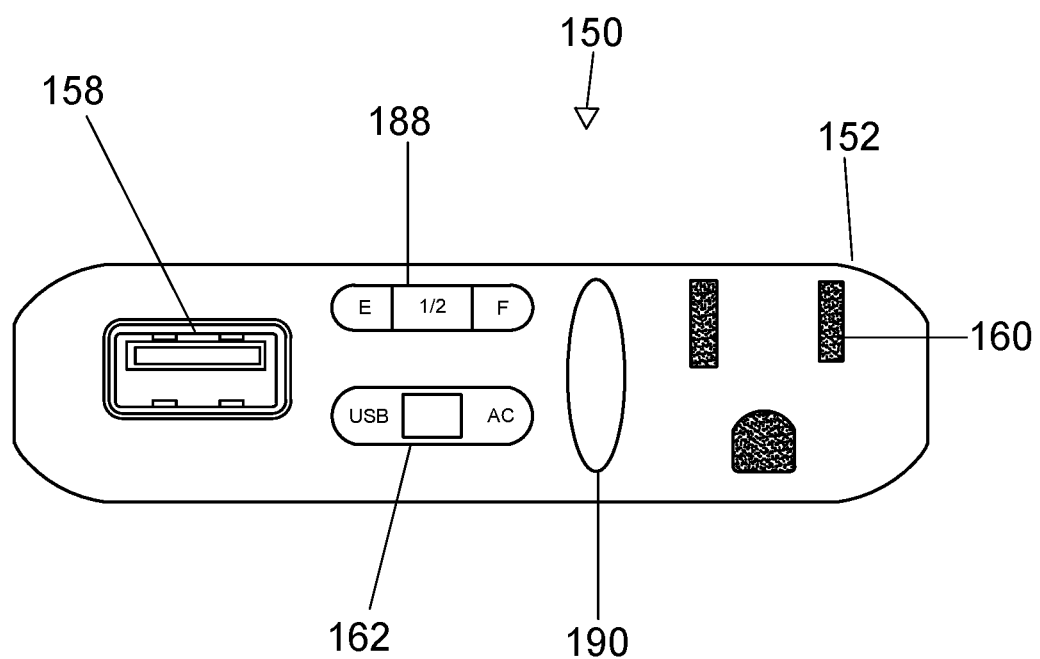
FIG. 15 shows in end view a portable charger according to a fourth embodiment of the present invention.

Referring to FIG. 15, another embodiment in accordance with the present invention is illustrated as portable power charger 150, in which like components are numbered alike to those of the portable power charger 120. The portable power charger 150 includes a housing 152 that houses an internal battery unit (not shown) operatively connected with USB power connection interfaces 158 and an AC power interface 160, as well as a battery level status indicator 188. The portable power charger 150 has a three-way power slide switch 162, which selects among a power block mode, a power supply mode, or a flashlight mode. For purposes of the flashlight mode, the portable power charger 150 also includes an LED lamp 190. In place of the charging plug 126 and charging cable 124 shown in FIGS. 12-13, the portable power charger 150 utilizes a micro USB power input connection port or a two-prong AC flip plug (not shown).

Figure 16:
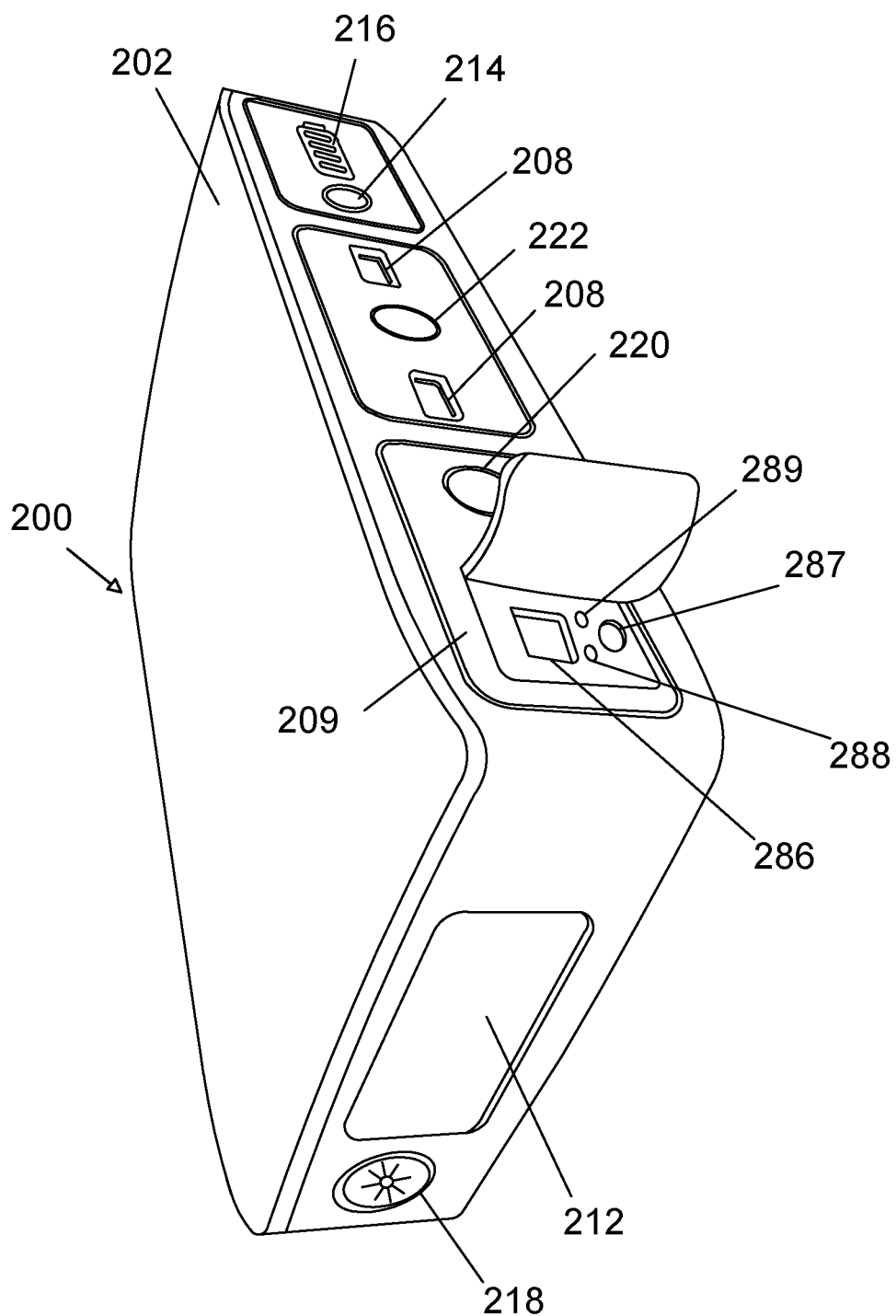
FIG. 16 shows a first perspective view a portable charger according to a fifth embodiment of the present invention.
Figure 17:
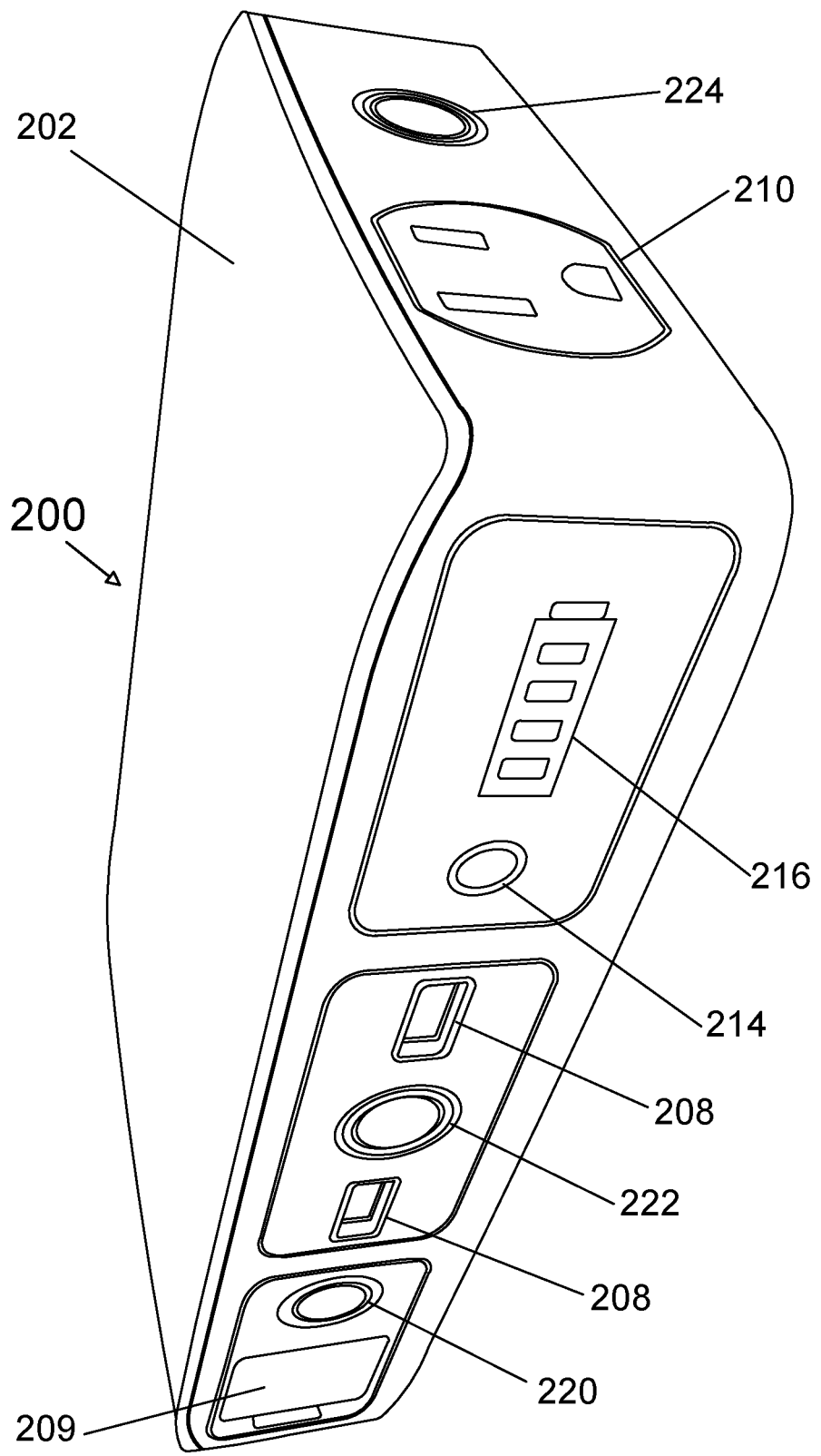
FIG. 17 shows a second perspective view the fifth portable charger of FIG. 16.

FIGS. 16 and 17 show opposite end perspective views of a portable power charger 200 in accordance with another embodiment of the present invention. The portable power charger 200 includes a housing 202 that houses an internal rechargeable battery 207, as well as USB power connection ports 208, an ignition power outlet 209, and an AC power interface 210.

The ignition power outlet 209 may be a modified EC5 connector with up to 500 A current capability. For example, the ignition power outlet 209 may include positive and negative power sockets 286, 287 according to the conventional EC5 configuration as well as positive and negative sensing sockets 288, 289 that are disposed symmetrically across the midline of the positive and negative power sockets. These modifications to the EC5 configuration are further discussed with reference to FIGS. 18 and 22. Alternatively, the power sockets 286, 287 and the sensing sockets 288, 289 may be otherwise arranged to enforce polarity of the ignition power outlet 209. For example, the positive and negative sensing sockets may be disposed asymmetrically; or the positive and negative power sockets may be of different shapes other than the EC5 shapes.

Figure 20:
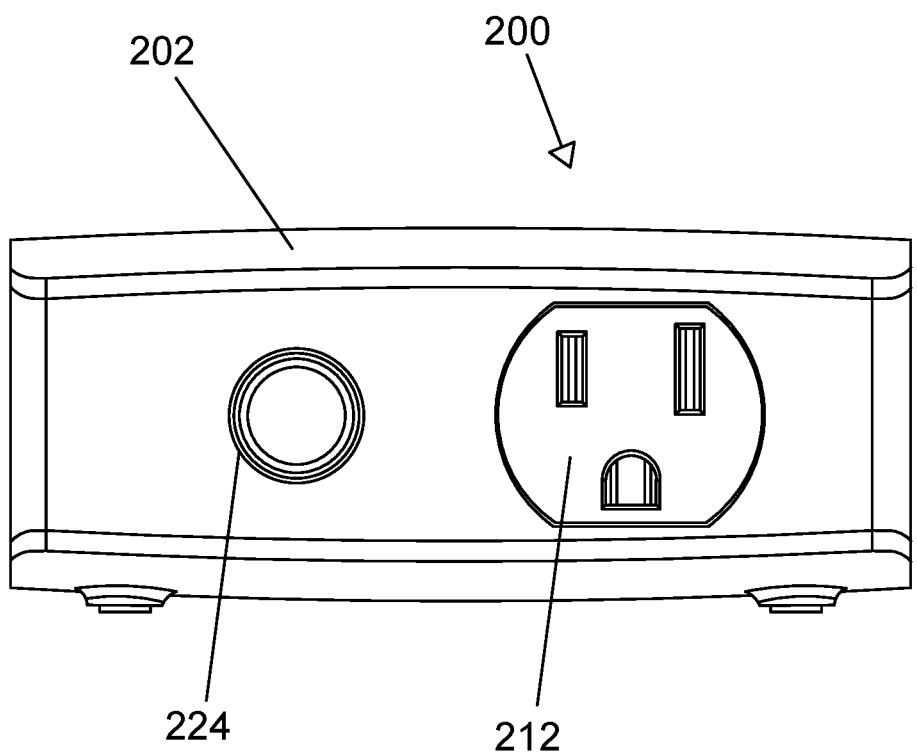
FIG. 20 shows a second end planar view of the portable charger of FIG. 16.

Referring to FIG. 20, the AC power interface 210 is shown as a U.S. standard AC socket (NEMA 5-15) but could alternatively be built to a different standard (e.g., Europlug, JIS). This interface 210 is operatively connected with the internal battery 207 and designed primarily for charging laptops from the charger 200.

Figure 18:
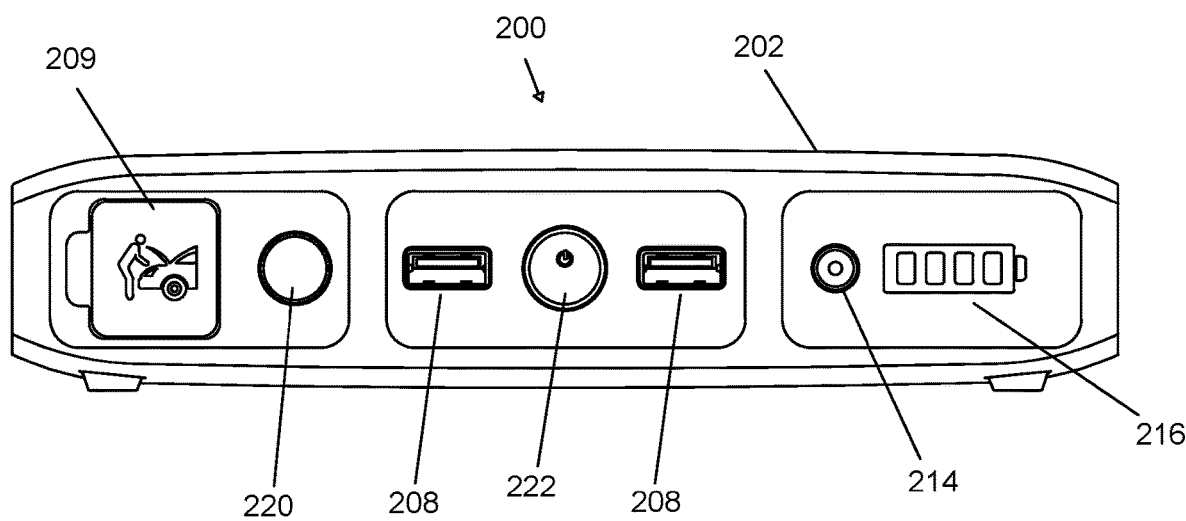
FIG. 18 shows a side planar view of the portable charger of FIG. 16.

Referring to FIG. 18, the USB power connection ports 208 are operatively connected with the internal battery 207 and provide and electrical charge to hand-held, portable electronic devices that are connected to the charger 200 via the connection ports 208. In preferred embodiments, the USB ports act as power output ports for directing a charge from the internal battery 207 to electrical devices for recharging. In alternate embodiments, one USB connection port can act as a power input for recharging the internal battery 207 when the charger 200 is connected to an external power source via the port. In other embodiments, the USB ports can be two-way charging ports that act as either a power input or a power output depending on what is connected to the port.

Figure 19:
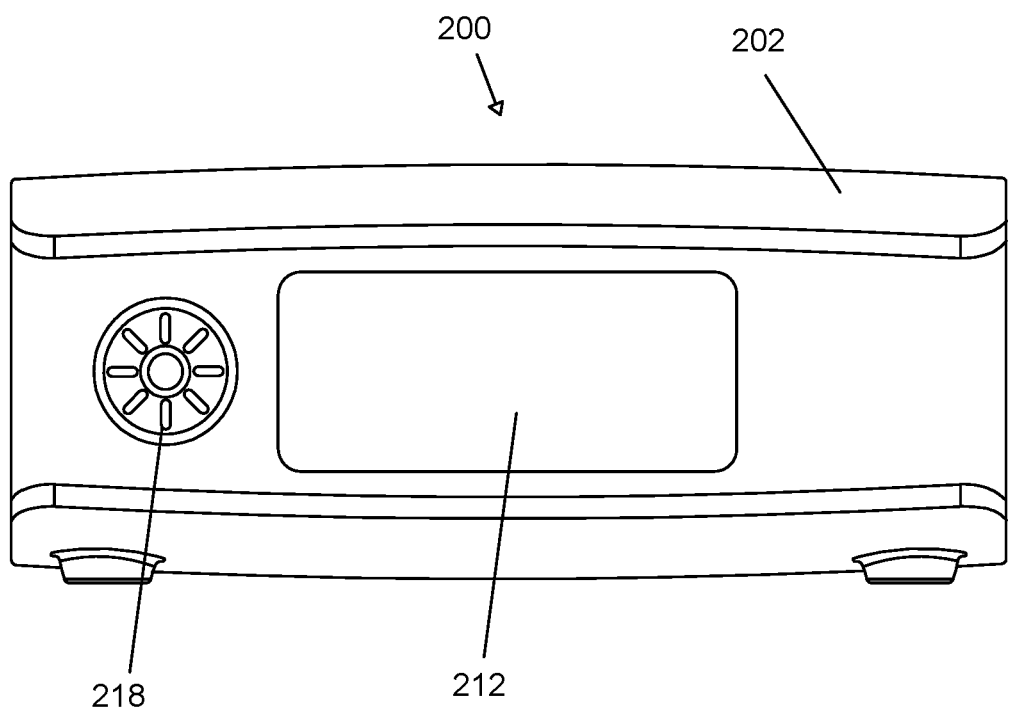
FIG. 19 shows a first end planar view of the portable charger of FIG. 16.

The housing 202 also houses a DC power input connector 214, a battery status indicator 216, a jump start button 220, a USB power button 222, and an AC power button 224. Referring to FIG. 19, the charger 200 also includes an LED work lamp or floodlight 212 operatively controlled by a flood lamp power button 218

In addition to the USB power interfaces 208 and the DC power input connector 214, a wireless power transmitter and a wireless power receiver can be provided for wirelessly charging electronic devices and for wirelessly recharging the internal battery 207. Exemplary wireless power technology is disclosed in Applicant's U.S. Pat. No. 9,318,915, issued Apr. 19, 2016, hereby incorporated by reference in its entirety.

FIGS. 21-24 provide schematics of internal circuitry of the portable power charger 200 in accordance with the present invention.

Figure 21:
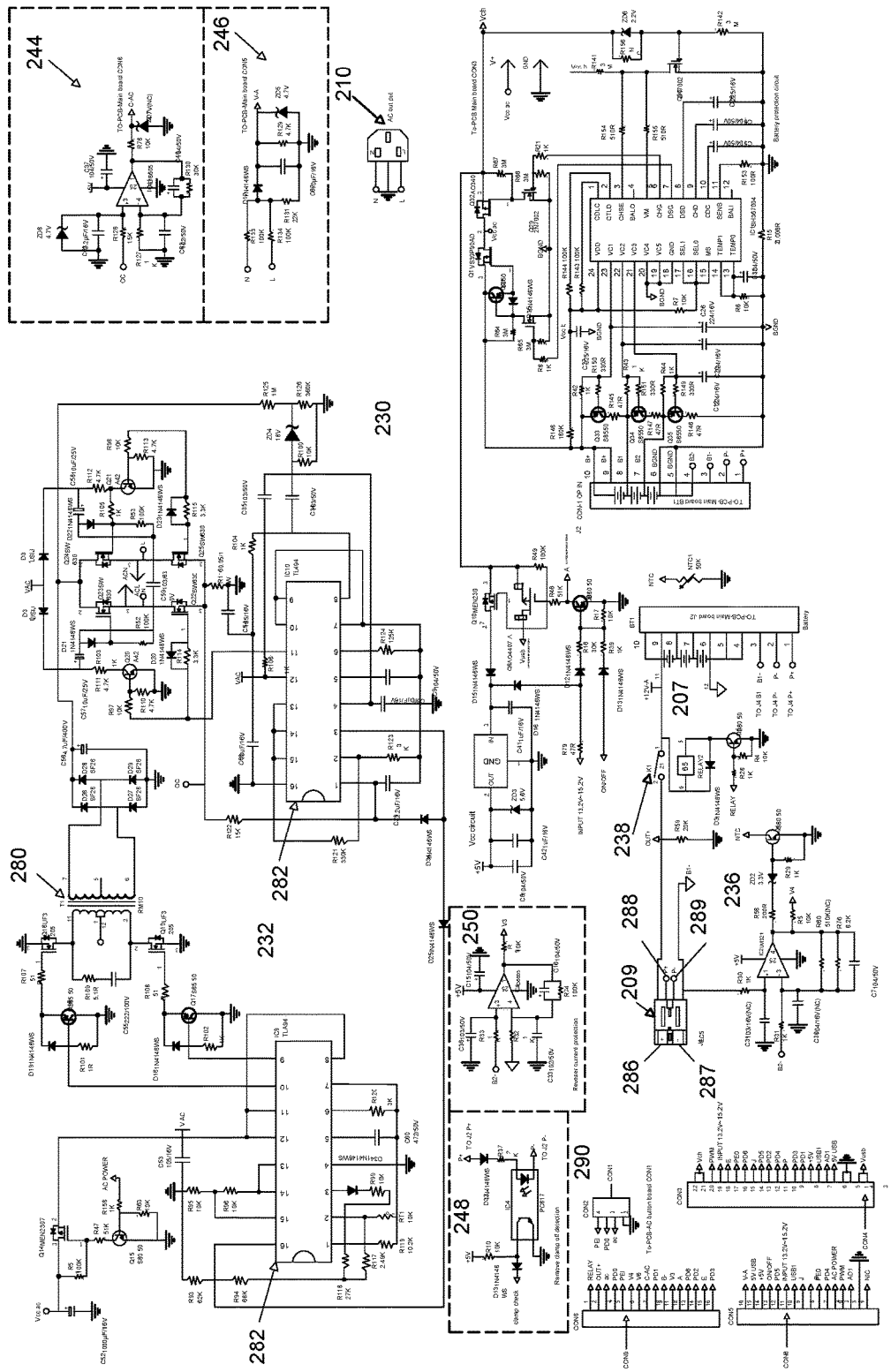
FIG. 21 shows a main board schematic of the fifth portable charger of FIG. 16.

FIG. 21 shows in schematic view a main board 230, which operatively electrically connects the internal battery 207 with the AC power interface 210 via an AC inverter circuit 232 and a battery protection circuit 234. The main board 230 also houses a jump start circuit 236, which operatively electrically connects the internal battery 207 with the ignition power outlet 209 via a safety relay 238. The main board 230 also houses certain protective sub-circuits, which provide signals to a microcontroller 240 that is housed on a microcontroller board 242 (shown in FIG. 23). The protective subcircuits include an AC overcurrent protection circuit 244 and an AC overvoltage/undervoltage protection circuit 246, which are related to the AC power interface 210; as well as a clamp check circuit 248 and a reverse current protection circuit 250, which are related to the jump start circuit 236.

Figure 22:
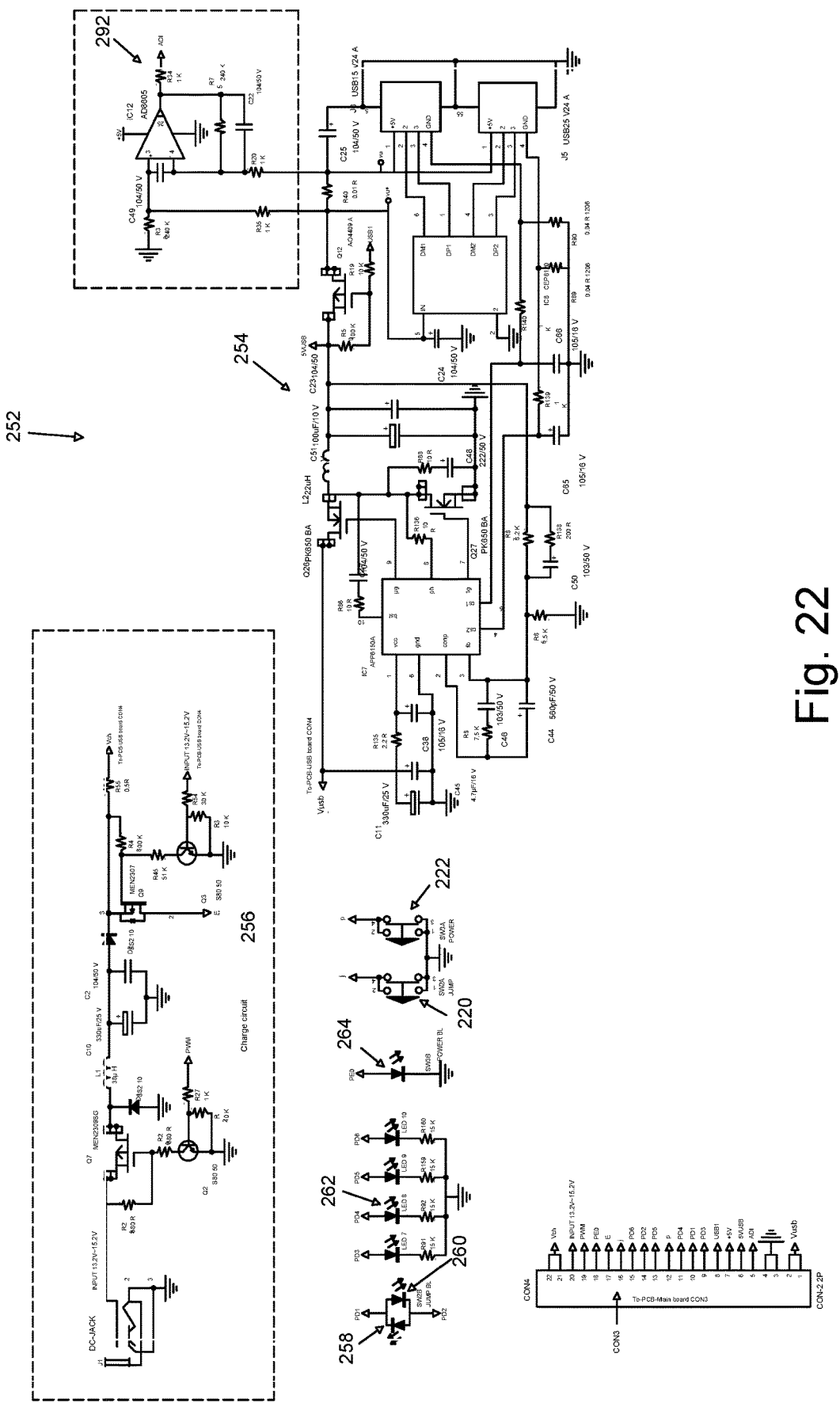
FIG. 22 shows a USB board schematic of the fifth portable charger of FIG. 16.

FIG. 22 shows in schematic view a USB board 252, which operatively electrically connects the internal battery 207 with the USB power outlets 208 via a USB power circuit 254. The USB board 252 also operatively electrically connects the internal battery 207 with the DC power input connector 214 via a charging circuit 256. The USB board 252 also houses a jump start active LED 258, a jump start error LED 260, a plurality of battery indicator LEDs 262, a USB power active LED 264, the jump start switch 220, and the USB power button 222.

Figure 23:
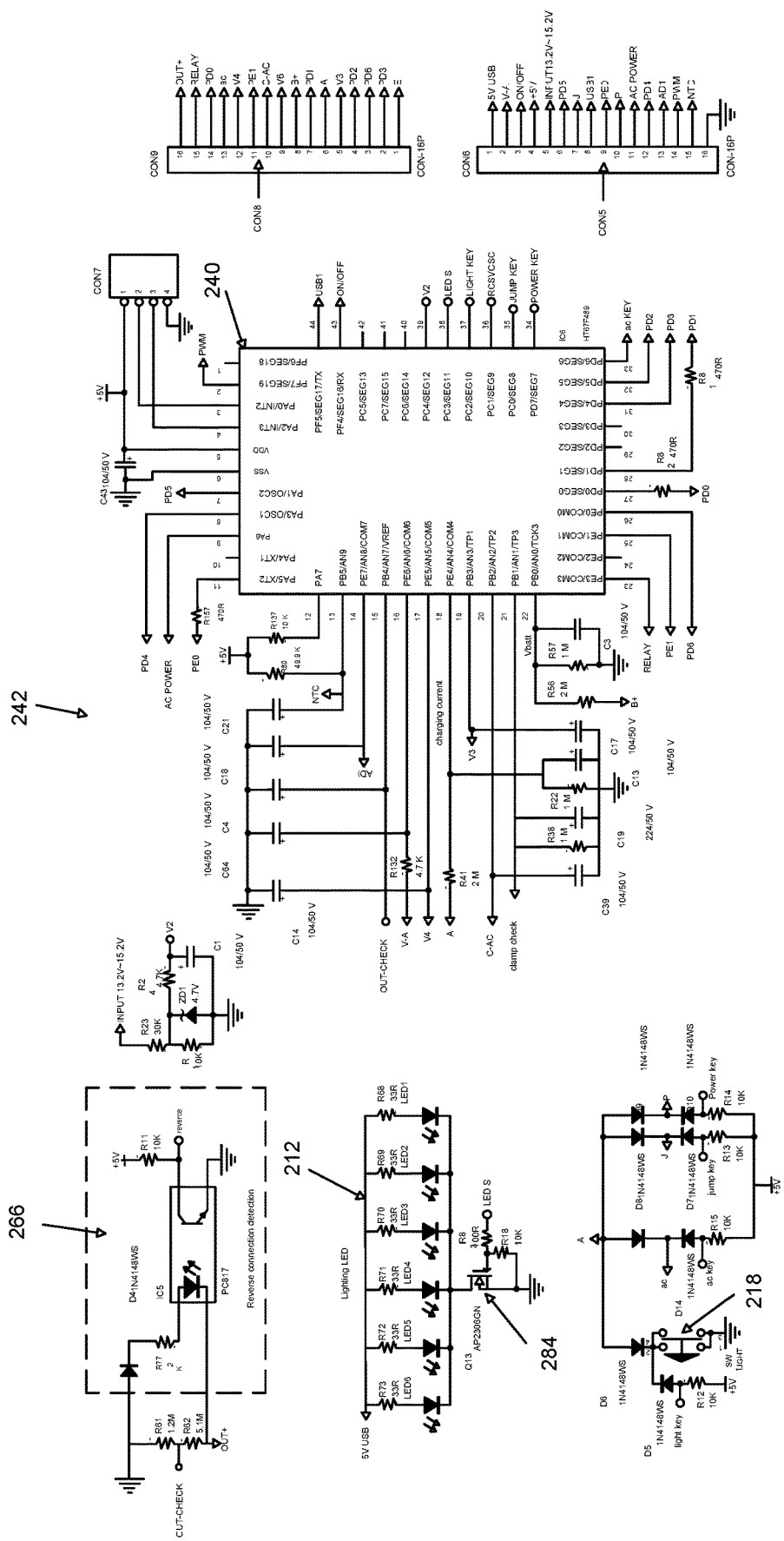
FIG. 23 shows a microcontroller board schematic of the fifth portable charger of FIG. 16.

FIG. 23 shows in schematic view the microcontroller board 242, which houses the microcontroller 240 that coordinates safety, charging and power functions of the portable charger 200. The microcontroller board 242 also houses the LED flood lamp 212, the flood lamp button 218, and a jump start reverse connection detection circuit 266.

Figure 24:
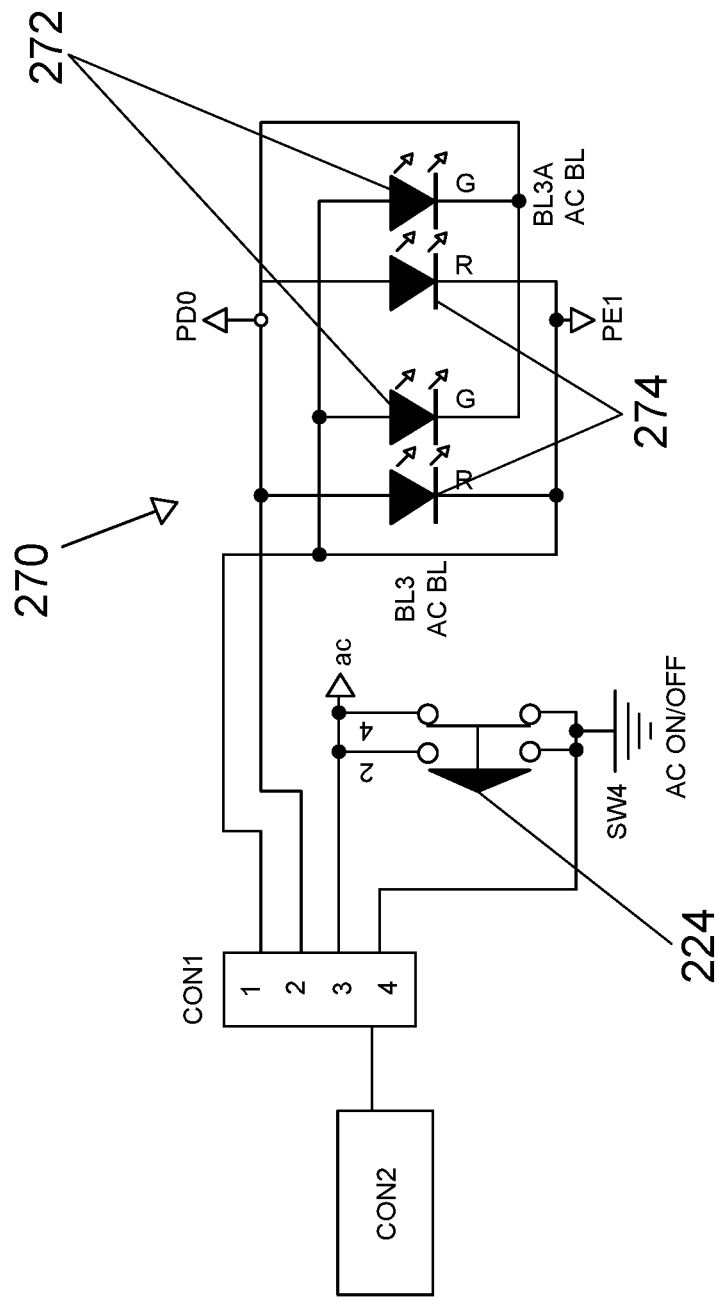
FIG. 24 shows an AC button board schematic of the fifth portable charger of FIG. 16.

FIG. 24 shows in schematic view an AC power button board 270, which houses the AC power button 224 as well as AC power active LEDs 272 and AC power error LEDs 274.

Referring specifically to FIG. 21, the internal battery 207 preferably is a lithium polymer three cell battery with each cell having a nominal voltage of 3.7 V for a total battery voltage of 11.1 V. The battery capacity preferably is 5300 mAh or 58830 mWh. Discharge rating preferably is 20° C. minimum with a charge rating of 1° C. maximum. Internal resistance preferably is maximum 12 mOhm. Preferably, the fully charged cell CoV is 4.2 V and the discharged cell CoV is 2.8 V. The battery 207 preferably self discharges less than 2% per month at 20° C., and preferably can operate between about −20° C. to about 70° C. and between about 0% to about 95% relative humidity. Preferably, the battery 207 can sustain at least about 300 cycles and has a maximum discharge current of 500 A for up to four seconds.

The AC inverter circuit 232 includes a transformer 280 as well as integrated circuits 282, which together produce a modified AC sinewave across a neutral terminal N and a line terminal L of the AC output 210. The AC inverter circuit 232 produces rated power of 65 W at about 115 V AC. The inverter circuit 232 receives power from the internal battery 207 via the battery protection circuit 234. The AC inverter circuit 232 is activated by pressing the AC power button 224 to send a signal to the inverter circuit, and is deactivated by pressing the AC power button 224 a second time to send a signal to the inverter circuit. The signals are provided from the microcontroller 240 (shown in schematic view of FIG. 23), which responds to the button pushes of the AC power button 224 (shown in schematic view of FIG. 24).

The battery protection circuit 234 coordinates charging of the internal battery 207 by the charging circuit 256 that is housed on the USB board 252 (shown in schematic view of FIG. 22). During charging, the battery protection circuit 234 provides overcharge protection as well as cell balancing functionality. The overcharge protection prevents any individual battery cell being charged above 4.2 V cell voltage. The cell balancing functionality provides for balancing the cell voltages within 50 mV and charging currents within 300 mA. Also, during discharge of the internal battery 207, the battery protection circuit 234 provides cell undervoltage protection.

In connection with the AC power outlet 210, the main board 230 also houses the AC overcurrent protection circuit 244 as well as the AC overvoltage/undervoltage protection circuit 246. The AC overcurrent protection circuit 244 provides a signal to the microcontroller 240 in case the output current to the AC power outlet 210 exceeds a pre-set threshold. The signal from the AC overcurrent protection circuit 244 will cause the microcontroller 240 to send a signal to the AC inverter circuit 232 for deactivating the AC inverter circuit. Similarly, the AC overvoltage/undervoltage protection circuit 246 provides a signal to the microcontroller 240 in case the output voltage across the neutral and line terminals N, L exceeds a pre-set high-low range. The signal from the AC overvoltage/undervoltage protection circuit 246 will cause the microcontroller 240 to send a signal to the AC inverter circuit 232.

Thus, when the AC power button 224 is pushed to turn on the AC power outlet 210, the microcontroller 240 will check the AC protective circuits 240, 242. The microcontroller 240 also will check the battery protection circuit 234, and will prevent operation in case the battery voltage is less than 10 V. During these checks, which require about four seconds, the microcontroller 240 will cause the AC power active LEDs 272 (housed behind the AC power button 224, and shown in schematic view of FIG. 24) to flash green. In case an undervoltage condition is detected—e.g., less than about 10 V total battery voltage or less than about 2.8 V on any cell of the battery—then the microcontroller 240 will cause the AC power active LEDs 272 to continue flashing green for one minute before automatically cutting power to the AC power outlet 210. On the other hand, in case the AC protective circuits 240, 242 and the internal battery voltage check satisfactory, then the microcontroller 240 will cause the AC power active LEDs 272 to illuminate steady green.

Moreover, during provision of power from the AC power outlet 210 the microcontroller 240 continuously monitors output power. In case an overcurrent (over power) condition is detected—e.g., power draw in excess of about 80 W—then the microcontroller 240 will cut power to the AC power outlet 210 and will cause the AC power error LEDs 274 (shown in FIG. 24) to flash red until the AC power button 224 is pressed again to shut off the AC outlet 210. On the other hand, in case the microcontroller 240 detects an under power situation (power draw less than about 1 W), then after one minute, the microcontroller will remove power from the AC power outlet 210.

Still referring to FIG. 21, the main board 230 also houses the jump start circuit 236, which operatively electrically connects the internal battery 207 with the ignition power outlet 209. The jump start circuit 236 includes the safety relay 238, which is controlled by the microcontroller 240 in order to provide or remove power from the internal battery 207 to the ignition power outlet 209. In particular, a first signal from the microcontroller 240 to the safety relay 238 will cause the safety relay to open, preventing electrical connection of the internal battery 207 with the ignition power outlet 209. On the other hand, a second signal from the microcontroller 240 to the safety relay 238 will cause the safety relay to close, permitting electrical connection of the internal battery 207 to the ignition power outlet 209.

The microcontroller 240 sends signals to the safety relay 238 based on signals from several protective circuits, including the clamp check circuit 248, the reverse current protection circuit 250, and the reverse connection detection circuit 266 (shown in the schematic view of FIG. 23). In case the microcontroller 240 receives satisfactory signals from all safety circuits, then it energizes the safety relay 238 to permit current to flow from the internal battery 207 through the ignition power outlet 209.

The clamp check circuit 248 checks whether the charging cable alligator clips are connected onto a car battery, based on voltage sensing at the ignition power outlet. More particularly, the ignition power outlet 209 includes not only positive and negative power sockets 286, 287 but also positive and negative sensing sockets 288, 289. At the ignition power outlet 209, the sensing sockets 288, 289 are electrically isolated from the power sockets 286, 287. The charging cable and its alligator clips have a special design (further described below with reference to FIG. 25) so that the sensing sockets 288, 289 can be energized by connecting the charging cable alligator clips onto a car battery that has at least some residual charge. When the sensing sockets 288, 289 are energized with correct polarity (positive sensing socket 288 at higher potential than negative sensing socket 289—e.g., at least about 2.8 V higher potential), they drive an optical isolator 290 within the clamp check circuit 248, thereby providing a satisfactory clamp check signal from the clamp check circuit to the microcontroller 240. As mentioned, the clamp check signal is one of the signals required for the microcontroller 240 to close the safety relay 238. Thus, the clamp check circuit 248 provides spark protection against the safety relay 238 being closed before the clamps are connected onto the battery to be charged. Although as shown the clamp check signal is a low signal, the clamp check circuit 248 alternatively can be constructed to produce a high signal when the alligator clips are attached onto the terminals of a car battery.

The reverse current protection circuit 250 checks whether the car battery is trying to charge the internal battery 207 through the ignition power outlet 209. In case the reverse current protection circuit 250 detects greater than about 10 A current in the reverse direction, it will send a shut off signal to the microcontroller 240. The reverse connection detection circuit 266 checks whether the charging cable alligator clips are crossed up at the car battery, based on voltage sensing at the ignition power outlet 209.

The microcontroller 240 also implements several other safety functions. These include a car battery overvoltage check and a car battery undervoltage/short circuit check. According to the car battery overvoltage check the microcontroller 240 will keep the safety relay 238 open in case the voltage at the ignition power outlet 209 is in excess of about 13.2 V. According to the car battery undervoltage/short circuit check the microcontroller 240 will keep the safety relay 238 open in case the voltage at the ignition power outlet 209 is less than about 2.5 V. Thus, the undervoltage check also provides short circuit protection against the positive and negative cable clamps coming in contact.

Referring to FIG. 22, which shows the USB board 252 of the portable charger 200, the internal battery 207 can be recharged via the charging circuit 256 that is operatively electrically connected with the DC power input connector 214. The charging circuit 256 receives a pulse width modulation signal from the microcontroller 240, and provides charging voltage to the battery protection circuit 234.

The USB board 252 also houses the USB power circuit 254, which is operatively electrically connected with the USB power outlets 208. The USB power circuit 254 receives 5 V DC current from the internal battery 207 via the battery protection circuit 234 (as shown in FIG. 21). The USB power circuit 254 provides 5 V DC, 2.4 A current to each of the USB power outlets 208 when it is activated by pressing the USB power button 222. The USB power circuit 254 provides the following signatures at D+, D− lines of the USB power outlets 208: divider 1 DCP for 2.7 V on each line; BC1.2 DCP for shorting across the D+, D− lines; Chinese Telecom Standard YD/T 1591-2009 Shorted Mode for shorting across the D+, D− lines; and 1.2 V on both D+ and D− lines.

While the USB power circuit 254 is activated, the USB power active LED 264 glows steady blue behind the USB power button 222. Also while the USB power circuit 254 is activated, the microcontroller 240 monitors a one-minute shutdown detection circuit 292, which sends a low current signal to the microcontroller 240 in response to current draw less than 30 mA through the USB power outlets 208. After one minute of receiving the low current signal from the one minute shutdown detection circuit 292, the microcontroller 240 will shut off the USB power circuit 254 to remove 5 V DC from the USB power outlets 208. Additionally, the microcontroller 240 monitors voltage of the internal battery 207 via the battery protection circuit 234. In case internal battery voltage is less than 2.8 V per cell or less than 10 V total, the microcontroller 240 will shut off the USB power circuit 254.

In response to the jump start switch 220 being pressed once from its OFF condition, the microcontroller 240 initiates a jump start sequence. In the jump start sequence, the microcontroller 240 causes several things to happen in a specific order. First, the microcontroller 240 checks the level of charge of the internal battery 207. In case the internal battery 207 has greater than 50% charge (greater than about 11 V output), then the microcontroller 240 will proceed with the jump start sequence. Otherwise, the jump start sequence exits.

Next, the jump start active LED 258 flashes green for approximately four seconds while the microcontroller 240 checks safety signals from the three jump start protection circuits. In case the reverse connection detection circuit 266 indicates that the charging cable clamps are attached onto the wrong battery terminals, then the jump start error LED 260 will flash red until the jump start button 267 is pressed again to toggle the jump start circuit 236 off. On the other hand, in case any other safety condition is not met, the jump start active LED 258 may continue to flash green for up to one minute while the microcontroller 240 continues to monitor for satisfactory safety checks. After one minute monitoring, the microcontroller 240 will shut off the jump start sequence.

After the safety checks are completed satisfactorily, the microcontroller 240 closes the safety relay 238 to energize the ignition power outlet 209, and the jump start active LED 258 illuminates steady green. The microcontroller 240 then begins a five minute countdown. During the five minute countdown as many as three attempts may be made to jump start the vehicle to which the clamps are connected. The microcontroller 240 monitors the voltage at the ignition power outlet 209 in order to detect successful or unsuccessful attempt(s) to jump start the vehicle. For each attempt to jump start the vehicle, the microcontroller 240 will allow a starting current (up to 500 A) to flow through the ignition power outlet 209 for up to four seconds. A successful jump start is detected when the vehicle battery voltage steadily exceeds 13.2 V (this may cause reverse current from the vehicle battery to the internal battery). An unsuccessful jump start is detected when the vehicle battery voltage does not exceed 13.2 V after the four second starting current. At the end of the five minute countdown, or after a successful jump start, or after three unsuccessful jump starts, or at any time the clamps are disconnected from the vehicle or from the ignition power outlet 209, the microcontroller 240 will open the safety relay 238 to disconnect the internal battery 207 from the ignition power outlet 209.

The microcontroller 240 also continuously monitors power draw during the five minute countdown. The charger 200 is configured to provide as much as 100 A sporadic auxiliary load current (radio, air conditioning compressor, etc.) up until the first attempt to jump start the vehicle. However, in case the microcontroller 240 detects current draw constantly in excess of 30 A for greater than thirty seconds, then the microcontroller will cause the safety relay 238 to open and will cause the jump start error LED 260 to rapid flash red and will cause the USB power LED 266 to rapid flash blue.

FIG. 23 shows the microcontroller board 242, which houses the microcontroller 240 as well as the LED flood lamp 212, the flood lamp button 218, and the jump start reverse connection detection circuit 266. Pressing the flood lamp button 218 one time causes the microcontroller 240 to activate the LED flood lamp 212 by gating a transistor 284. Pressing the flood lamp button 218 a second time causes the microcontroller 240 to deactivate the LED flood lamp 212 by removing gate voltage from the transistor 284. Operation of the jump start reverse connection detection circuit 266 has been described above.

Referring to FIG. 24, the AC power button 224 can be pressed one time to cause the microcontroller 240 to activate the AC inverter circuit 232 and a second time to deactivate the AC inverter circuit. While the AC inverter circuit 232 is active, the microcontroller 240 illuminates the AC power active LEDs 272 a steady green. In case an AC circuit check is unsatisfactory, as discussed above, then the microcontroller 240 causes the AC power error LEDs 274 to flash red.

Thus, a portable power charger 200 according to the embodiment of FIGS. 16-24 provides USB power, AC power, jump start power, and a LED flood lamp within a convenient package that can be hand-carried or carried in a purse or backpack.

Referring to FIGS. 25-26, an innovative jumper cable assembly 300 can be used in various embodiments of the invention, for example, the embodiments of FIG. 1-11 or 16-24. The car starter cable includes positive and negative jumper cables 302, 304 as well as positive and negative sensing cables 306, 308. The cables are bundled together in a gang plug 309, which is a modified EC5 type connector. Each of the jumper cables is operatively electrically connected at one end to a respective alligator clip or clamp 310 or 311 and at the other end to a respective power plug 312 or 313, which are shaped according to the basic EC5 configuration. Each of the positive or negative sensing cables is operatively electrically connected at one end to a respective sensing contact 314 or 315 and at the other end to a respective sensing plug 316 or 317, which are additional modifications to the EC5 plug configuration. The sensing contacts 314, 315 are housed within respective clamps 310, 311 and are electrically isolated from the clamps by insulative inserts 318. Each of the clamps 310, 311 also includes an upper handle 320, a lower handle 322, a spring 323, upper and lower jaws 324, 326 and a conductive wire 328 that operatively electrically connects the upper and lower jaws with the respective jumper cable 302 or 304.

In use, for example with the portable charger of FIGS. 16-24, the power plugs 312, 313 and the sensing plugs 316, 317 are plugged into their respective power sockets 286, 287 and sensing sockets 288, 289. Thus, the positive power plug 312 is plugged into the positive power socket 286 while the negative sensing plug 317 is plugged into the negative sensing socket 289. When the positive clamp 310 is connected onto a battery positive terminal, the positive sensing plug and socket 316, 288 are energized by the battery positive terminal via the positive sensing contact 314. Similarly, when the negative clamp 311 is connected onto a battery negative terminal, the negative sensing plug and socket 317, 289 are energized by the battery negative terminal via the negative sensing contact 315. As discussed above with reference to FIG. 21, correct energization of the sensing sockets 288, 289—by attaching the positive and negative clamps 310, 311 onto both terminals of a battery to be charged—produces a satisfactory clamp check signal from the clamp check circuit 248. The clamp check signal is one of the safety signals that the microcontroller 240 must receive in order to energize the safety relay 238.

In an alternate design of the charger 200, a connector cable can be provided for using the charger 200 to recharge or provide reserve power to an electric car. The electric car connector cable can be adapted to fit into the ignition power outlet 209 and include sufficient circuitry to ensure a properly compatible charge to the electric car's power port—for example, mimicking a DC charging station. Alternatively, the charger 200 could be provided with a separate, electric car-specific charging port on the charger housing 202. Still further, the electric car connector cable can be adapted for connection to one of the USB power outlet ports 208 or the AC power outlet 210.

In nay of the illustrated embodiments, a portable power charger in accordance with the present invention may further include a solar panel, for example, on the top face of the charger housing, for charging the internal battery.

The foregoing description of embodiments of the present invention has been presented for the purpose of illustration and description. It is not intended to be exhaustive or to limit the invention to the precise form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular uses contemplated.

What is claimed is:

1. A portable charger capable of outputting both AC and DC power, comprising:
   a charger battery;
   a USB power circuit operatively electrically connected with the charger battery and also with a USB power outlet;
   an AC inverter circuit operatively electrically connected with the charger battery and with a wireless transmitter and an AC power outlet;
   a jump start circuit operatively electrically connected with the charger battery and with an ignition power outlet, said ignition power outlet comprising a positive power socket, a negative power socket, a positive sensing socket and a negative sensing socket, wherein the positive and negative sensing sockets are electrically isolated from the positive and negative power sockets; and
   a microcontroller configured to establish or interrupt the operative electrical connections of the USB power circuit, the AC inverter circuit and the jump start circuit with the ignition power outlet in response to system parameters,
   wherein the microcontroller senses voltage across the positive and negative sensing sockets and is configured to interrupt the operative electrical connection of the jump start circuit to the ignition power outlet until proper voltage is sensed across the positive and negative sensing sockets.

2. The portable charger according to claim 1, further comprising a housing in which the charger battery is disposed and a power slide switch provided on said housing for manually controlling the mode of operation of the portable charger between a power block charging mode and a power supply mode.

3. The portable charger according to claim 1, further comprising a power switch for manually controlling the mode of operation of the portable charger between AC power, USB power, and jump start power.

4. The portable charger according to claim 3, wherein the power switch controls the mode of operation of the portable charger between AC power, USB power, jump start power and wireless power.

5. The portable charger according to claim 1, further comprising an LED flood lamp.

6. The portable charger according to claim 5, further comprising a power slide switch for manually controlling the mode of operation of the portable charger between a power block charging mode, a power supply mode, and a flood lamp mode.

7. The portable power charger according to claim 1, further comprising an AC input operatively connected with the charger battery for recharging of said charger battery when the AC input is connected with an external power source.

8. The portable power charger according to claim 7, further comprising a housing in which the charger battery is disposed and wherein said AC input comprises a charging cable disposed on said housing and having a charger plug on an end thereof adapted for connection with an external power source.

9. The portable power charger according to claim 8, wherein a storage cavity is formed in the housing for receiving the charging cable and the charger plug when not in use.

10. The portable charger according to claim 7, further comprising a housing in which the charger battery is disposed and wherein said AC input comprises a wireless receiver disposed within said housing.

11. A portable charger capable of outputting both AC and DC power, comprising:
    a charger battery disposed within a charger housing;
    a USB power circuit operatively electrically connected with the charger battery and also with a USB power outlet;
    an AC inverter circuit operatively electrically connected with the charger battery and with an AC power outlet;
    a jump start circuit operatively electrically connected with the charger battery and with an ignition power outlet, said ignition power outlet comprising a positive power socket, a negative power socket, a positive sensing socket and a negative sensing socket, wherein the positive and negative sensing sockets are electrically isolated from the positive and negative power sockets; and
    a microcontroller configured to establish or interrupt the operative electrical connections of the USB power circuit, the AC inverter circuit and the jump start circuit with the ignition power outlet in response to system parameters;
    wherein the microcontroller senses voltage across the positive and negative sensing sockets and is configured to interrupt the operative electrical connection of the jump start circuit to the ignition power outlet until proper voltage is sensed across the positive and negative sensing sockets.

12. The portable charger according to claim 11, further comprising a power slide switch provided on said housing for manually controlling the mode of operation of the portable charger between a power block charging mode and a power supply mode.

13. The portable charger according to claim 11, further comprising a power switch for manually controlling the mode of operation of the portable charger between AC power, USB power, and jump start power.

14. The portable charger according to claim 11, further comprising an LED flood lamp.

15. The portable charger according to claim 14, further comprising a power slide switch for manually controlling the mode of operation of the portable charger between a power block charging mode, a power supply mode, and a flood lamp mode.

16. The portable power charger according to claim 11, further comprising an AC input operatively connected with the charger battery for recharging of said charger battery when the AC input is connected with an external power source.

17. The portable power charger according to claim 16, further comprising a housing in which the charger battery is disposed and wherein said AC input comprises a charging cable disposed on said housing and having a charger plug on an end thereof adapted for connection with an external power source.

18. The portable power charger according to claim 17, wherein a storage cavity is formed in the housing for receiving the charging cable and the charger plug when not in use.

* * * * *